United States Patent
Andrizzi et al.

(10) Patent No.: US 10,255,946 B1
(45) Date of Patent: Apr. 9, 2019

(54) GENERATING TAGS DURING VIDEO UPLOAD

(71) Applicant: Amazon Technologies, Inc., Seattle, WA (US)

(72) Inventors: Stephan Josef Andrizzi, San Francisco, CA (US); Alex Carter, Oakland, CA (US); Peter Van Tuyl Bentley, Seattle, WA (US); William Christopher Banta, Lafayette, CA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 14/750,776

(22) Filed: Jun. 25, 2015

(51) Int. Cl.
*G11B 27/026* (2006.01)
*G11B 27/10* (2006.01)
*H04N 5/85* (2006.01)

(52) U.S. Cl.
CPC .......... *G11B 27/026* (2013.01); *G11B 27/105* (2013.01); *H04N 5/85* (2013.01)

(58) Field of Classification Search
CPC ...... H04N 5/782; H04N 21/4532; H04N 5/85; G11B 27/026; G11B 27/105
USPC .......................... 386/291, 296; 725/44, 46, 47
See application file for complete search history.

(56) References Cited

U.S. PATENT DOCUMENTS

| | | | |
|---|---|---|---|
| 9,313,556 B1 * | 4/2016 | Borel ................. | H04N 21/8549 |
| 9,418,703 B2 * | 8/2016 | Abbate ................. | H04N 9/8205 |
| 9,454,993 B1 * | 9/2016 | Lawson ............... | G11B 27/102 |
| 2011/0302504 A1 * | 12/2011 | Khare ..................... | H04L 51/32 715/751 |
| 2013/0124461 A1 * | 5/2013 | Dombrowski .... | G06F 17/30038 707/610 |
| 2014/0136493 A1 * | 5/2014 | Subramanian .... | G06F 17/30138 707/693 |
| 2014/0150042 A1 * | 5/2014 | Pacor ............... | H04N 21/21805 725/116 |
| 2014/0152834 A1 * | 6/2014 | Kosseifi .......... | H04N 21/21805 348/158 |
| 2014/0313341 A1 * | 10/2014 | Stribling ................. | H04L 67/02 348/157 |
| 2015/0373306 A1 * | 12/2015 | Flores ..................... | H04N 5/77 348/157 |
| 2016/0292511 A1 * | 10/2016 | Ayalasomayajula ........ | G06K 9/00751 |
| 2016/0292881 A1 * | 10/2016 | Bose .................. | G06K 9/00751 |

* cited by examiner

*Primary Examiner* — Mishawn N Hunter
(74) *Attorney, Agent, or Firm* — Pierce Atwood LLP

(57) ABSTRACT

Devices, systems and methods are disclosed for allowing multiple devices to generate tags associated with video data captured by a single device. For example, a recording device may capture and upload video data and the multiple devices may generate tags identifying memorable moments. The tags may be used to generate a video summary, such as a single video summary for the captured video data that includes video data associated with tags generated by multiple devices. In addition, the tags may be associated with unique devices and may be used to generate multiple video summaries. For example, the tags may be used to generate individual video summaries for each of the multiple devices. Therefore, multiple devices may tag the captured video data to generate the single video summary and/or multiple individual video summaries.

18 Claims, 18 Drawing Sheets

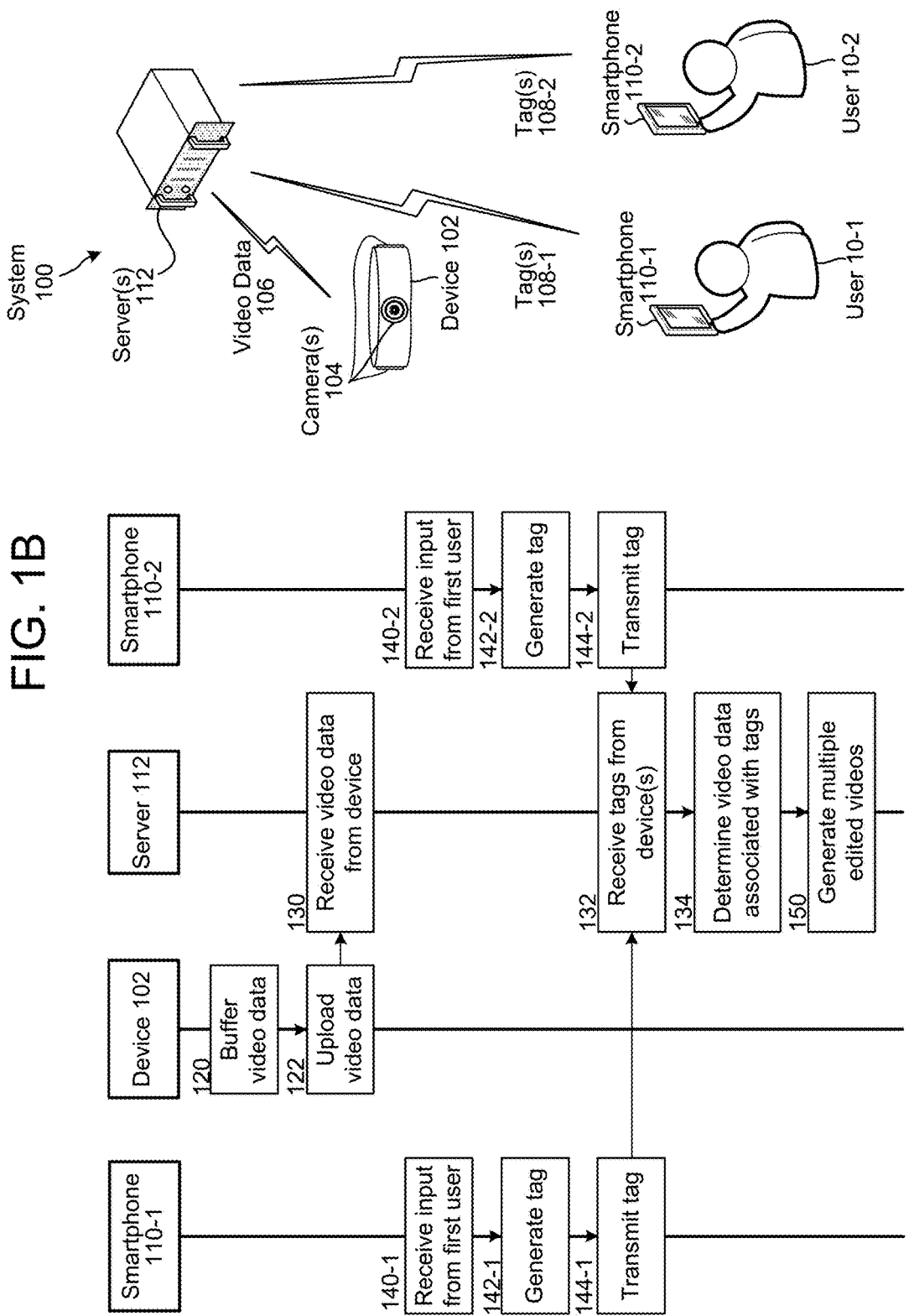

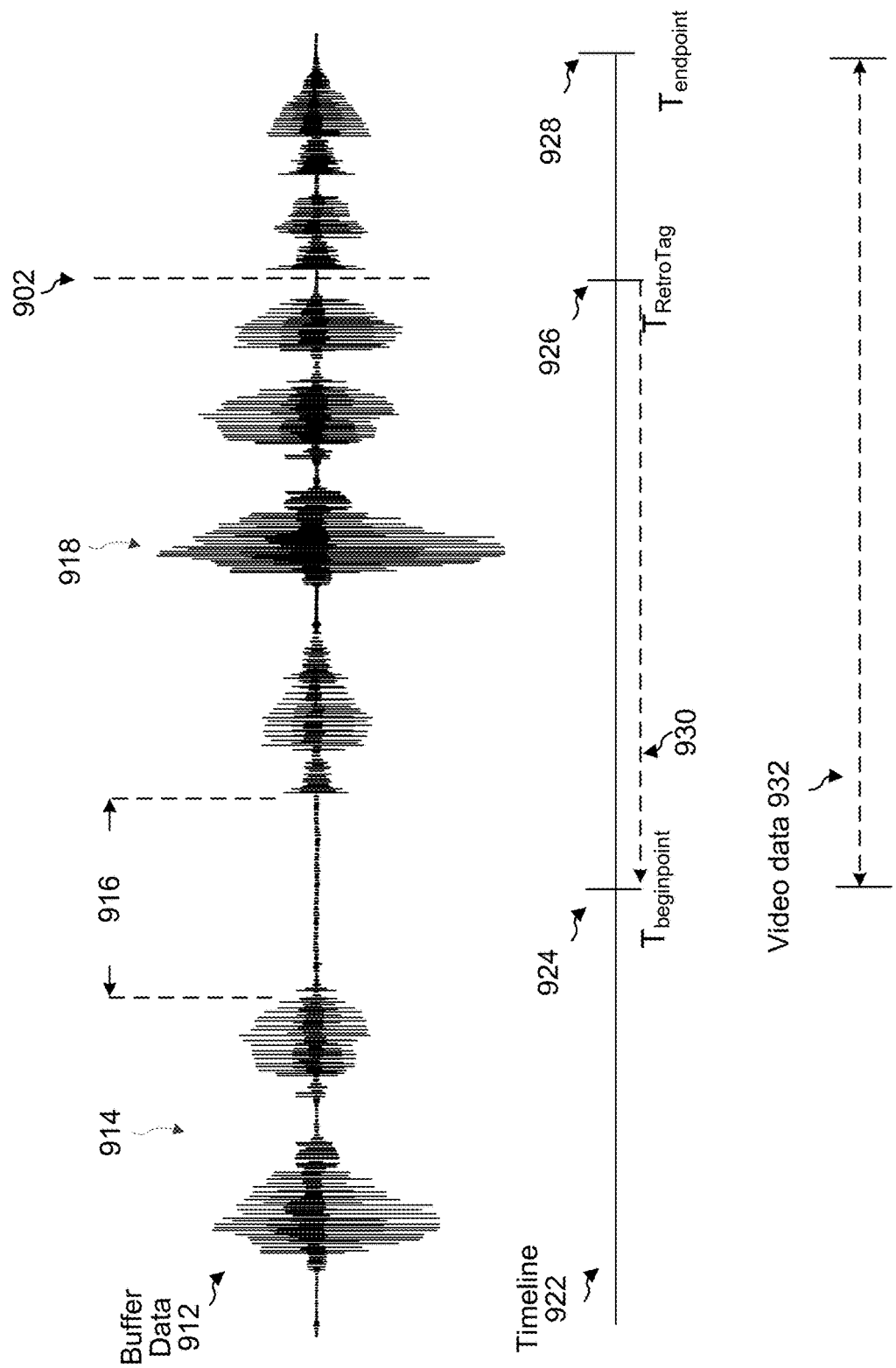

FIG. 14

| Dinner Party 1402 | | |
|---|---|---|
| Laughter | | Host and Hostess |

| Birthday Party 1404 | | |
|---|---|---|
| "Happy Birthday" "Surprise!" | Birthday Cake Opening Gifts | Birthday Celebrant |

| New Years Party 1406 | | |
|---|---|---|
| "Happy New Year!" | Kissing | Host and Hostess |

| Wedding Reception 1408 | | |
|---|---|---|
| "Congratulations" | Wedding Cake | Bride and Groom |

| Audio Trigger(s) | Object/Gesture Tracking | Facial Recognition |

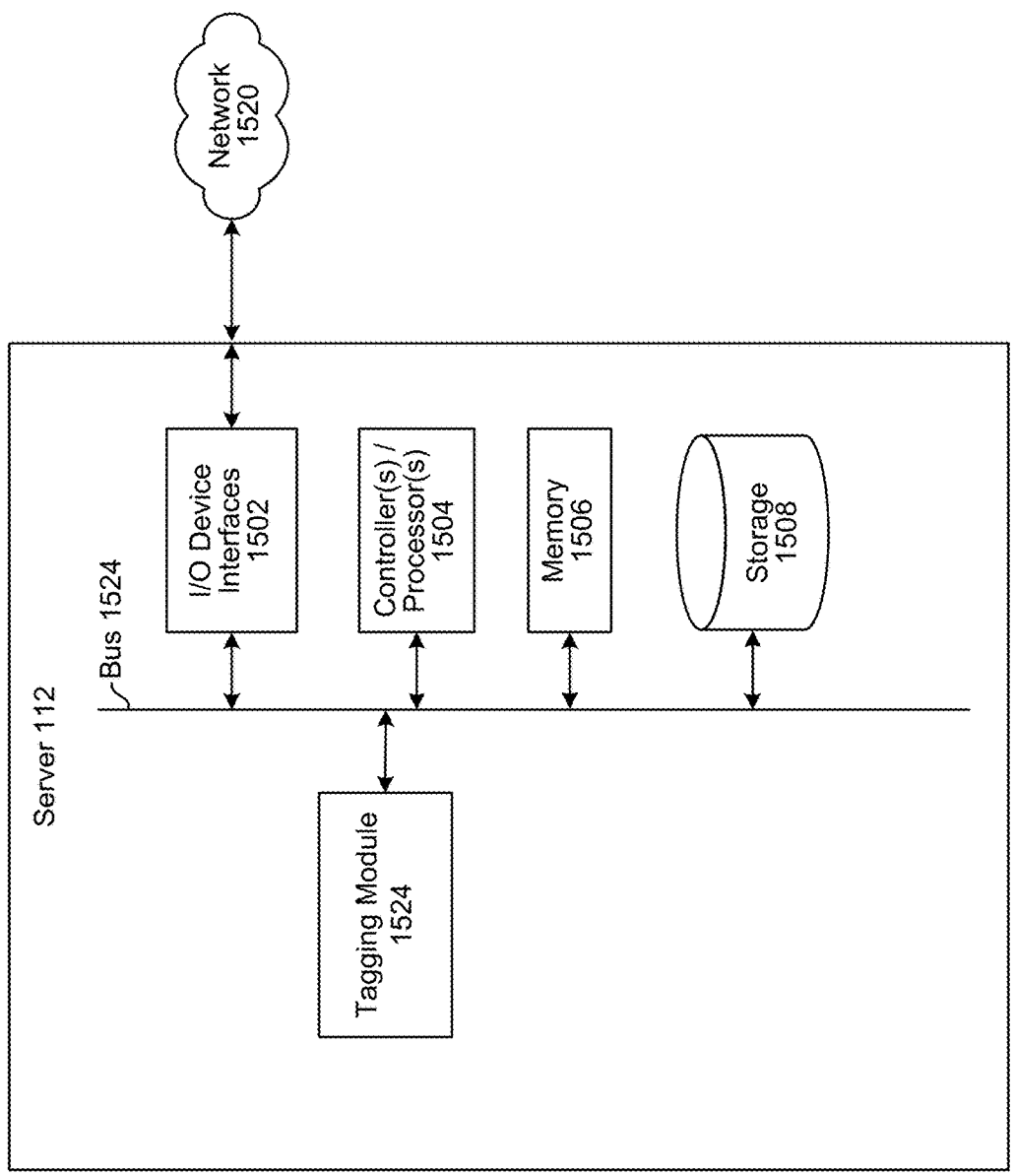

GENERATING TAGS DURING VIDEO UPLOAD

BACKGROUND

With the advancement of technology, the use and popularity of electronic devices has increased considerably. Electronic devices are commonly used to capture video data using one or more cameras. The video data may be captured over a lengthy period of time, resulting in a large volume of video data.

BRIEF DESCRIPTION OF DRAWINGS

For a more complete understanding of the present disclosure, reference is now made to the following description taken in conjunction with the accompanying drawings.

FIGS. 1A-1B illustrate overviews of systems for generating edited video clips based on user commands or indications according to embodiments of the present disclosure.

FIG. 9 illustrates an example of determining a beginpoint and an endpoint associated with the backward tag according to embodiments of the present disclosure.

FIG. 14 illustrates an example of customized triggers used to generate tags according to embodiments of the present disclosure.

FIGS. 15A-15B are block diagrams conceptually illustrating example components of a system according to embodiments of the present disclosure.

DETAILED DESCRIPTION

Figure 1A:
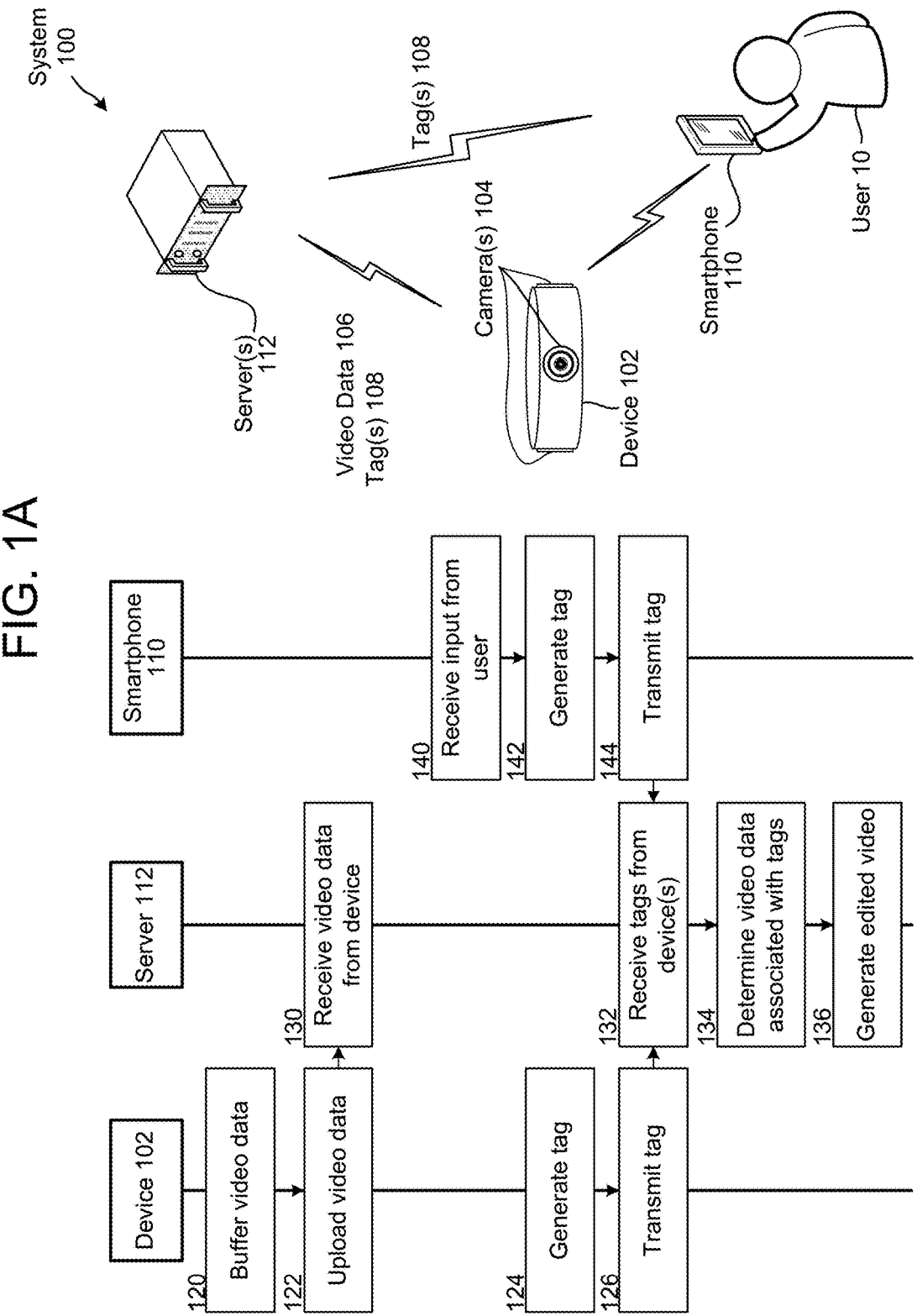

Electronic devices are commonly used to capture video data using one or more cameras. However, a user of a device may not be prepared to capture a moment of interest before such a moment happens and may therefore be too late to instruct the device to capture video data until after the moment of interest has begun and/or ended. To overcome this problem, the device may capture video data over a lengthy period of time, capturing the moment of interest in addition to other moments. However, capturing the lengthy period of time results in a large volume of video data. While the large volume of video data enables the device to capture the moment of interest, particular moments of interest may be lost within the large volume of video data.

To improve the capturing of video data, devices, systems and methods are disclosed that capture and buffer video data and tag moments of interest as they occur or shortly after they occur, enabling particular moments of interest to be identified and separated from the large volume of video data. For example, the device may capture and buffer video data during a standby mode using a circular buffer, enabling the device to store video data for a short duration of time before newest video data overwrites oldest video data. While the device may not be uploading the video data during the standby mode, the device may capture video data of a moment of interest and may store the video data in the circular buffer. During or after the moment of interest, the device may receive a command to select video data that was just captured and stored in the buffer, as that video data includes the moment of interest. The device may determine a beginning of the moment of interest, identify video data in the circular buffer from the beginning of the moment of interest, and may upload the video data and a tag to a server. The server may then use the tag and the video data in later operations, such as creating a video summary of an event, where the event includes the moment of interest.

As another example, the device may capture video data and upload the video data to a server during a recording mode, enabling the device to store a large volume of video data to the server over a lengthy period of time. During the operating/recording mode, the device may be configured to send video data to the server without necessarily storing the video data in the buffer prior to transmission to the server. To identify particular moments in time, the device and/or other devices may generate tags/indicators associated with the particular moments in time and may upload the tags to the server. A tag/indicator may comprise data associated with image data (which may include video data) of the video data that should be included in a video summary. The video data may be captured prior to the tag being generated, for example a tag being generated in response to a user command which comes after an event of interest. As explained in detail below, the system may be configured to identify a beginning point for video data where the beginning point is earlier in time than the received command and/or tag. The server may generate a video summary of the overall recording time using the tags. Thus, a period of three hours may result in a video summary of a few minutes, highlighting particular moments of interest as indicated, at least in part, by the received commands and/or tags. For example, a user may be attending a party and may want to capture the party without being distracted from the party itself. Therefore, the user may position the device at a central location in a room during the party and may generate tags using the device and/or the smartphone to identify moments of particular interest to be included in the video summary. The device may capture video data throughout the party, but the user may generate tags for specific moments or specific guests at the party.

In addition, multiple users may generate commands and/or tags and the server may generate a video summary including video data associated with the tags from the multiple users. Alternatively, the server may generate multiple video summaries, enabling each of the multiple users to receive a different video summary generated from the large volume of video data and/or associated audio data.

FIG. 1A illustrates an overview of a system 100 for implementing embodiments of the disclosure. The system 100 includes a device 102 coupled to camera(s) 104, a smartphone 110 controlled by a user 10 and server(s) 112. As illustrated in FIG. 1A, the device 102 may capture video data 106 using the camera(s) 104 and may upload the video data 106 and/or tag(s) 108 to the server 112. In addition to the video data 106, the device 102 may capture audio data associated with the video data using microphone(s) (not shown). Separately, the smartphone 110 may upload commands/tag(s) 108 to the server 112. The smartphone 110 may also send commands/tags to the device 102. The server 112 may receive the video data 106 and tag(s) 108 and may generate a short video including portions of the video data 106 associated with the tag(s) 108.

The device 102 may buffer (120) video data, upload (122) the video data to the server 112, and the server 112 may receive (130) the video data from the device 102. The device 102 may capture the video data during a record mode or during a standby mode. For example, the user 10 may send a command to the device 102 to begin capturing video data during a record mode and the device 102 may capture, buffer and upload the video data to the server 112 until the user 10 sends a command to stop capturing the video data. Alternatively, the device 102 may capture video data during a standby mode and may store the captured video data into a buffer, overwriting video data in the buffer as necessary while in standby mode. For example, the buffer may be a circular buffer capable of storing a few minutes of video data, overwriting earliest video data with latest video data as the circular buffer is filled. Upon receiving a command from the user 10, such as a backward tag command discussed in greater detail below, the device 102 may upload at least a portion of the video data stored in the buffer to the server 112. Therefore, the device 102 may capture and retain video data for a period of time, allowing the user 10 to retroactively record a moment in time.

For ease of explanation, steps 120, 122 and 130 are illustrated in FIG. 1A as discrete steps. However, the device 102 may continue to buffer and upload the video data and the server 112 may continue to receive the video data while the device 102 and server 112 are performing other steps. Therefore, steps 120, 122 and 130 may be performed concurrently or substantially simultaneously to the other steps illustrated in FIG. 1A.

Concurrent with or subsequent to the device 102 capturing the video data, the device 102 may generate (124) a tag and transmit (126) the tag to the server 112. For example, the device 102 may receive an input from the user 10 to generate the tag, such as from the smartphone 110, a remote control, an external button or the like. Examples of receiving an input are discussed in greater detail below with regard to FIGS. 7, 8 and 9. Alternatively, the device 102 may analyze the video data and identify a trigger to generate a tag, as will be discussed in greater detail below with regard to FIGS. 13 and 14.

Concurrent with or subsequent to the device 102 capturing the video data, and irrespective of the device 102 performing steps 124 and 126, the smartphone may receive (140) input from the user 10, generate (142) a tag and transmit (144) the tag to the server 112. For example, the smartphone 110 may receive an input from the user 10 to generate the tag using an input user interface as discussed in greater detail below with regard to FIG. 6. While the smartphone 110 may generate the tag, it may also (or instead) generate a more general command or indication that is sent to device 102 or server 112 to select certain video data captured by the device 102. The command or indication may include the tag or the device 10 or server 112 may generate the tag in response to the command/indication. While FIG. 1A illustrates the smartphone 110 transmitting the tag directly to the server 112, the smartphone 110 may transmit the tag to the device 102 without departing from the present disclosure.

The server 112 may receive (132) the tags from the device(s), may determine (134) video data associated with the tags and may generate (136) edited video including the video data associated with the tags. For example, the server 112 may generate the edited video as discussed in greater detail below with regard to FIGS. 3, 4 and 11.

The edited video may be a video summary of the video data 106. Thus, using the video data 106 uploaded from the device 102 and the tag(s) 108 uploaded from the device 102 and/or the smartphone 110, the server 112 may automatically generate the edited video. For example, the server 112 may use video summarization techniques known to one of skill in the art to generate the edited video using the tag(s) 108. The edited video may encapsulate video from a period of time (e.g., several hours) into a short video clip (e.g., several minutes) to commemorate an event. For example, a user 10 may be attending a party and may want to capture the party without being distracted from the party itself. Therefore, the user 10 may position the device 102 at a central location in a room during the party and may generate tags using the device 102 and/or the smartphone 110 to identify moments of particular interest to be included in the edited video. The device 102 may capture video data throughout the party, but the user 10 may generate tags for specific moments or specific guests at the party. Thus, the ultimate video summarization may include a number of video clips/segments, where the video clips may be tagged and associated with a particular time/timestamp, date, and/or location indicating relationship to other video clips in the video summarization. The processes described herein may be used to tag certain video clips, where the tags may be used to include the video clips in the video summarization. The video clips may be ordered chronologically, where included video clips are ordered by their relative recording time/timestamp. The video summarization may also include a collection of still images, in a manner akin to a picture slideshow, where the still images are selected from the original video data and may include images that were the subject of tags received as described above.

Figure 2:
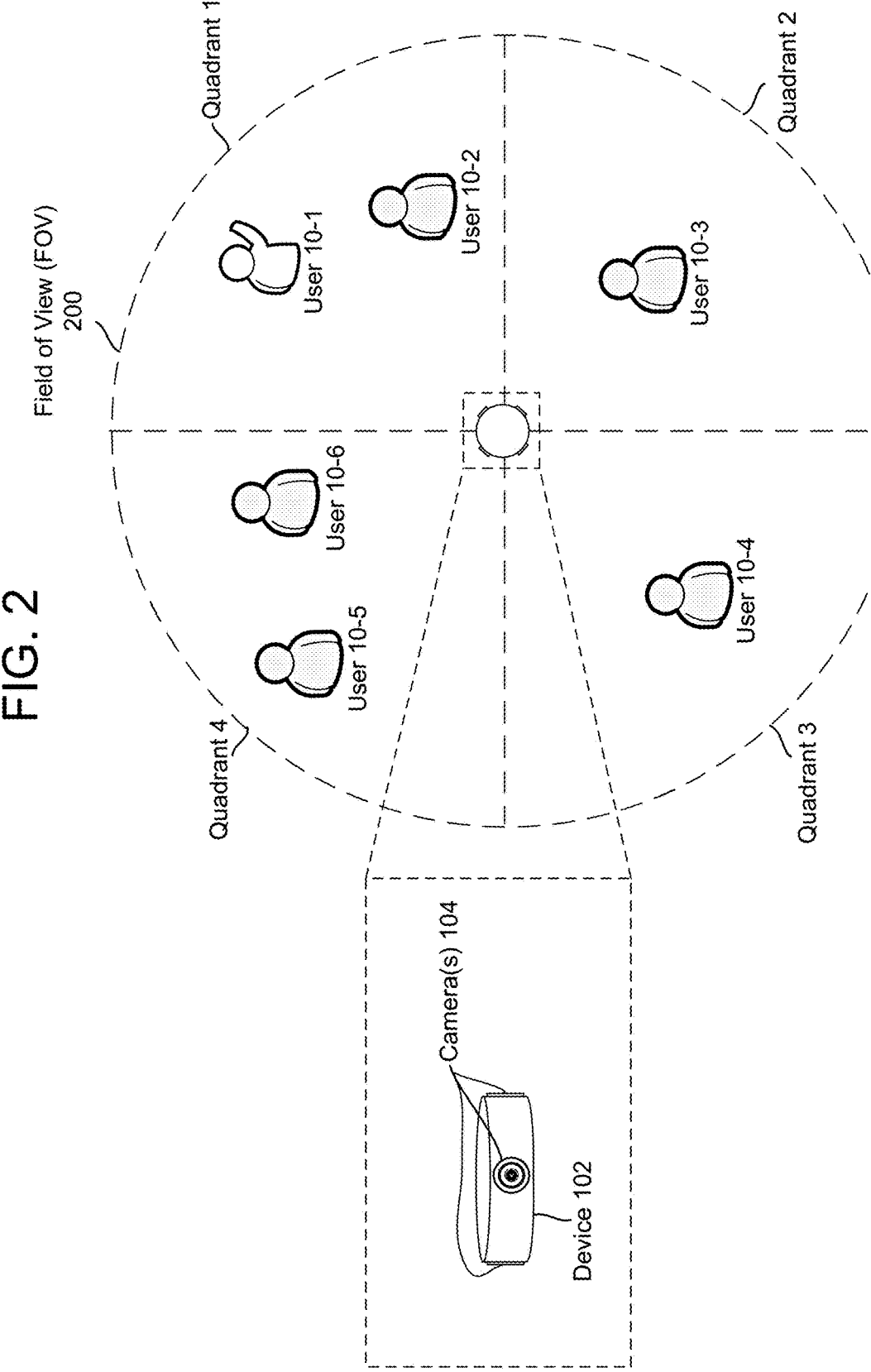
FIG. 2 illustrates an example of fields of view for cameras of a recording device according to embodiments of the present disclosure.

To capture the party from a central location, the device 102 may include multiple cameras 104. For example, the device 102 may include four or more cameras and capture video data in a 360 degree circle surrounding the device 102, as illustrated in FIG. 2. In the example illustrated in FIG. 2, the device 102 may include at least four cameras 104 and may use the four cameras 104 to capture video data within a field of view (FOV) 200. For example, a first camera 104-1 may capture video data in Quadrant 1, a second camera 104-2 may capture video data in Quadrant 2, a third camera 104-3 may capture video data in Quadrant 3 and a fourth camera 104-4 may capture video data in Quadrant 4. By combining the video data from cameras 104-1 to 104-4 using methods known to those of skill in the art, the device 102 may obtain video data from a FOV including everything around the device 102, including users 10-1 to 10-6.

Locating the cameras 104 inside the device 102 allows the device 102 to capture panoramic video data in a 360 degree circle. As a result, the edited video may include video data from multiple cameras and may generate additional perspectives, as the device 102 is not limited to a single perspective for each camera 104. However, while FIG. 2 illustrates the device 102 including four cameras directed outward to capture panoramic video data in a 360 degree circle, the disclosure is not limited thereto. Instead, the device 102 may include any number of cameras at any number of locations, including single camera configurations, multiple camera configurations that include external cameras connected to the device 102 and/or the server 112, or other configurations. For example, the device 102 may receive video data wirelessly from four cameras 104, each camera located in a corner of the room, without departing from the present disclosure. The ultimate edited video summary may include panoramic views, or may include only single views, for example alternating between video data captured by different cameras to show interesting video taken over the recording time period. Alternatively, certain video from multiple cameras taken at the same time may be "stitched" together, particularly when a moment of interest to be included in the edited video occurs over a boundary between the different fields of view of different cameras. Alternatively, a single camera on a device may capture video and receive tags as described herein. A single camera may also be used to create panoramic/360 degree views based on movement of the camera.

Certain metadata may be associated with a particular system/camera configuration, thus indicating to a server 112, or other component, the system configuration. That metadata may also be used to determine what kinds of video data or tags are likely to be received by the system, or what kinds of tags may be most useful when creating a video summarization/compilation. Further, to the extent certain tags are weighted or prioritized by the system when creating the compilation, those weights or priorities may change if the device(s) that are capturing video data are unable to create or process certain types of tags.

FIG. 1B illustrates an overview of a system 100 for implementing embodiments of the disclosure. The system 100 includes a device 102 coupled to camera(s) 104, a first smartphone 110-1 controlled by a first user 10-1, a second smartphone 110-2 controlled by a second user 10-2 and a server 112. As illustrated in FIG. 1B, the device 102 may capture video data 106 using the camera(s) 104 and may upload the video data 106 to the server 112. Separately, the first smartphone 110-1 may upload first tag(s) 108-1 to the server 112 and the second smartphone 110-2 may upload second tag(s) 108-2 to the server 112. The server 112 may receive the video data 106, the first tag(s) 108-1 and the second tag(s) 108-2 and may generate multiple short videos including portions of the video data 106 associated with the first tag(s) 108-1 and/or the second tag(s) 108-2.

For ease of explanation, descriptions of steps discussed above with regard to FIG. 1A will be omitted. As illustrated in FIG. 1B, the device 102 may buffer (120) video data, upload (122) the video data to the server 112, and the server 112 may receive (130) the video data from the device 102. For ease of explanation, steps 120, 122 and 130 are illustrated in FIG. 1B as discrete steps. However, the device 102 may continue to buffer and upload the video data and the server 112 may continue to receive the video data while the device 102 and server 112 are performing other steps. Therefore, steps 120, 122 and 130 may be performed concurrently or substantially simultaneously to the other steps illustrated in FIG. 1B.

Concurrent with or subsequent to the device 102 capturing the video data, the first smartphone 110-1 may receive (140-1) input from the first user 10-1, generate (142-1) first tag(s) 108-1 and transmit (144-1) the first tag(s) 108-1 to the server 112. Similarly, the second smartphone 110-2 may receive (140-2) input from the second user 10-2, generate (142-2) second tag(s) 108-2 and transmit (144-2) the second tag(s) 108-2 to the server 112.

The server 112 may receive (132) the tags from the device(s), may determine (134) video data associated with the tags and may generate (150) multiple edited videos including the video data associated with the tags. For example, the server 112 may generate the multiple edited videos as discussed in greater detail below with regard to FIG. 12.

Alternatively, or additionally, to receiving tags from different devices, the server may receive tags where each tag is associated with a different user ID and/or user profile. For example, a first user may be operating an application on a smartphone 110-1 where the application is configured to generate tags related to video being recorded by device 102 in communication with server 112. The first user may be logged in to the application using his user profile (here, the first user profile). A first tag generated by the first user interacting with the application on the smartphone 110-1 may then be associated with the first user profile. Thus, the server 112 may receive the first tag, along with an indication that the first tag is associated with the first user profile. A second user may then be logged in to the application (running either on smartphone 110-1 or on a different smartphone 110-2), only the second user is logged in using her user profile (here, the second user profile). A second tag generated by the second user interacting with the application (on whatever device) may then be associated with the second user profile. Thus, the server 112 may receive the second tag, along with an indication that the second tag is associated with the second user profile. The system may then use the tags and their respective associations with their respective user profiles to generate one or more video summarizations as described below, as well as to deliver the video summarizations to the user(s) (for example to an email address or device associated with the appropriate user profile).

Therefore, using the video data 106 uploaded from the device 102, the first tag(s) 108-1 uploaded from the first smartphone 110-1 and/or the second tag(s) 108-2 uploaded from the second smartphone 110-2, the server 112 may generate the multiple edited videos. Each of the multiple edited videos may encapsulate a period of time (e.g., several hours) into a short video clip (e.g., several minutes) to commemorate an event and may be specific for each user. For example, the server 112 may generate a first edited video for the first user 10-1 and a second edited video for the second user 10-2. The first edited video may include video data associated with only the first tag(s) 108-1 and the second edited video may include video data associated with only the second tag(s) 108-2, creating two separate edited videos from the same video data 106. However, the present disclosure is not limited thereto and each edited video may include portions of the video data 106 associated with tag(s) 108 from more than one user 10 or video data not associated with tags at all (for example, more mundane events used to set the stage of the even for purposes of video summarization). For example, while the first edited video may be tailored to the first user 10-1, the first edited video may include portions of the video data 106 associated with the first tag(s) 108-1 and the second tag(s) 108-2 and some video not associated with any tags. Similarly, while the second edited video may be tailored to the second user 10-2, the second edited video may include portions of the video data 106 associated with the first tag(s) 108-1 and the second tag(s) 108-2.

Figure 3:
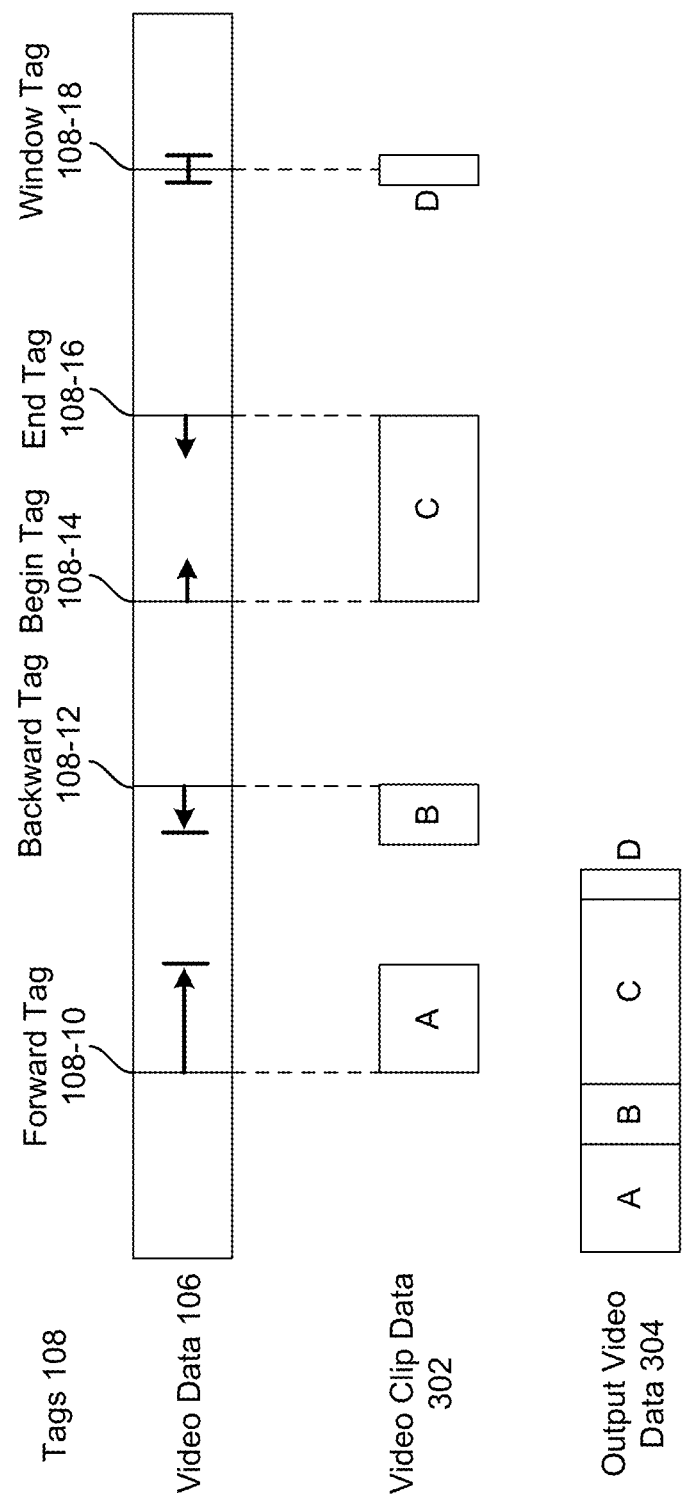
FIG. 3 illustrates an example of generating edited video clips using tags according to embodiments of the present disclosure.

FIG. 3 illustrates an example of generating edited video clips using tags according to embodiments of the present disclosure. As illustrated in FIG. 3, the tags 108 may be associated with specific moments within the video data 106, and the server 112 may use the tags 108 to determine video clip data 302 associated with each of the tags 108. The server 112 may then generate output video data 304 including at least portions of the video clip data 302.

To illustrate examples of different tags, FIG. 3 illustrates a forward tag 108-10, a backward tag 108-12, a begin tag 108-14, an end tag 108-16 and a window tag 108-18. The forward tag 108-10 is associated with a forward looking command, such as when the user 10 expects there to be a moment of interest in the near future. The video clip data 302-A associated with the forward tag 108-10 may extend between a beginpoint, such as a timestamp associated with the forward tag 108-10, and an endpoint subsequent to the beginpoint. The device 102 may determine the endpoint based on user preferences and/or user input associated with the forward tag 108-10. For example, the device 102 may determine the endpoint based on a fixed duration of time for all forward tags, a variable duration of time specified by the forward tag 108-10, an audio energy level of audio data associated with the video data 106 falling below a threshold, when no movement is detected in the video data 106 for a duration of time or the like. Thus, the forward tag 108-10 may begin at a first moment in time when the forward tag is received and may extend until a second moment in time. The period between the first moment in time and the second moment in time may be preconfigured (for example, 30 seconds) and/or may be adjustable.

The backward tag 108-12 is associated with a backward command, such as when the user 10 identifies that a moment of interest just occurred. The video clip data 302-B associated with the backward tag 108-12 may extend between a beginpoint, prior to a timestamp associated with the backward tag 108-12, and an endpoint subsequent to the timestamp. The device 102 may determine the beginpoint based on user preferences and/or user input associated with the backward tag 108-12. For example, the device 102 may determine the beginpoint based on a fixed duration of time for all backward tags, a variable duration of time specified by the backward tag 108-12, an audio energy level falling below a threshold immediately prior to the timestamp associated with the backward tag 108-12, when no movement was detected in the video data 106 for a duration of time immediately prior to the timestamp associated with the backward tag 108-12 or the like. Similarly, the device 102 may determine the endpoint as discussed above or using the timestamp associated with the backward tag 108-12. Thus, the backward tag 108-12 may begin at a first moment in time prior to when the backward tag 108-12 was received and may extend until a second moment in time, such as when the backward tag 108-12 was received. The period between the first moment in time and the second moment in time may be preconfigured (for example, 30 seconds) and/or may be adjustable.

The begin tag 108-14 and the end tag 108-16 are associated with a start/stop command, respectively, such as when the user 10 identifies a beginning and an end of a moment of interest. The video clip data 302-C may extend between a beginpoint associated with the begin tag 108-14 and an endpoint associated with the end tag 108-16. While the beginpoint is associated with the begin tag 108-14, the beginpoint is not limited to a timestamp associated with the begin tag 108-14. Instead, the device 102 may determine the beginpoint as discussed above, with the begin tag 108-14 being used as a rough estimate of the beginpoint. Similarly, the endpoint is not limited to a timestamp associated with the end tag 108-16. Instead, the device 102 may determine the endpoint as discussed above, with the end tag 108-16 being used as a rough estimate of the endpoint.

The window tag 108-18 is associated with a window command, such as when the user 10 wants to capture an number of images surrounding a particular moment in time. For example, when the user executes a window command the system may select a number of images before a timestamp of the command and the same number of images after the timestamp of the command to create a window of video clip data 302-D, centered on the timestamp. Alternatively, the window tag/command may be of a "snapshot" variety, where the window comprises just a single image, where the single image is associated with the timestamp of the command. Thus, the video clip data 302-D may be a single frame or image shown for a duration of time. The single frame may be captured based on the window tag 108-18, such as the timestamp associated with the window tag 108-18, although the present disclosure is not limited thereto. The device 102 may determine the duration of time based on user preferences and/or user input.

While FIG. 3 illustrates several examples of tags 108, the disclosure is not limited thereto and the tags 108 may vary. In addition, the device 102 may receive multiple tags 108 of each type and/or tags 108 from multiple users without departing from the disclosure, as will be discussed in greater detail below with regard to FIG. 11.

Figure 4:
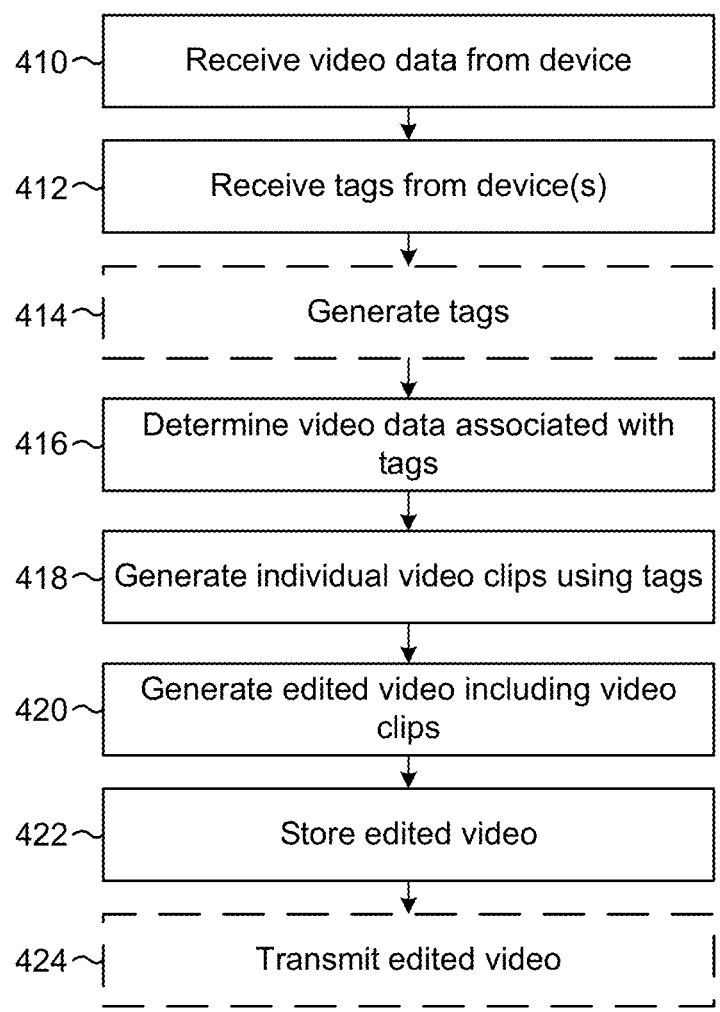
FIG. 4 is a flowchart conceptually illustrating an example method for generating an edited video clip using tags according to embodiments of the present disclosure.

FIG. 4 is a flowchart conceptually illustrating an example method for generating an edited video clip using tags according to embodiments of the present disclosure. The server 112 may receive (410) video data from the device 102. For example, the device 102 may capture, buffer and upload the video data and the server 112 may receive the video data as it is uploaded and may store the video data on the server 112.

The server 112 may receive (412) tags from device(s), such as the device 102, the smartphone 110 or other devices. For example, the device 102 may receive an input from the user 10 to generate the tag, such as from the smartphone 110, a remote control, an external button or the like. Examples of receiving an input are discussed in greater detail below with regard to FIGS. 7, 8 and 9. Alternatively, the device 102 may analyze the video data and identify a trigger to generate a tag, as will be discussed in greater detail below with regard to FIGS. 13 and 14. As another example, the smartphone 110 may receive an input from the user 10 to generate the tag using an input user interface as discussed in greater detail below with regard to FIG. 6.

The server 112 may optionally generate (414) tags. For example, the server 112 may analyze the video data and identify a trigger to generate a tag, as will be discussed in greater detail below with regard to FIGS. 13 and 14. Examples of triggers may include audio triggers, object tracking, gesture tracking and/or facial recognition. For example, the server 112 may identify an audio trigger and may generate a tag based on the audio trigger. The server may also generate a tag after receiving an indication from a device 102 or user 10. For example, the server may receive a command from a device 102, which may have originated from the press of a physical button on the device, a message received from an application running on the device or on a linked smartphone 110, etc. The server 112 may also recognize a gesture by a user 10 in the video data. For example, the server 112 may be configured to recognize certain movements (e.g., particular hand motions, head gestures, etc.) and to create a tag based on such recognitions. Any of these may be indications from which the server may generate a tag.

The server 112 may determine (416) video data associated with the tags, may generate (418) individual video clips using the tags and may generate (420) edited video including the video clips. For example, the server 112 may use the tags to determine a beginpoint and an endpoint for the individual video clips as described in greater detail above with regard to FIG. 3.

The server 112 may store (422) the edited video and may optionally transmit (424) the edited video. For example, the server 112 may transmit the edited video to the smartphone 110 or to another device. Therefore, the user 10 may receive the edited video during the party and may be able to display the edited video to other guests present at the party without performing additional video editing.

Figure 5:
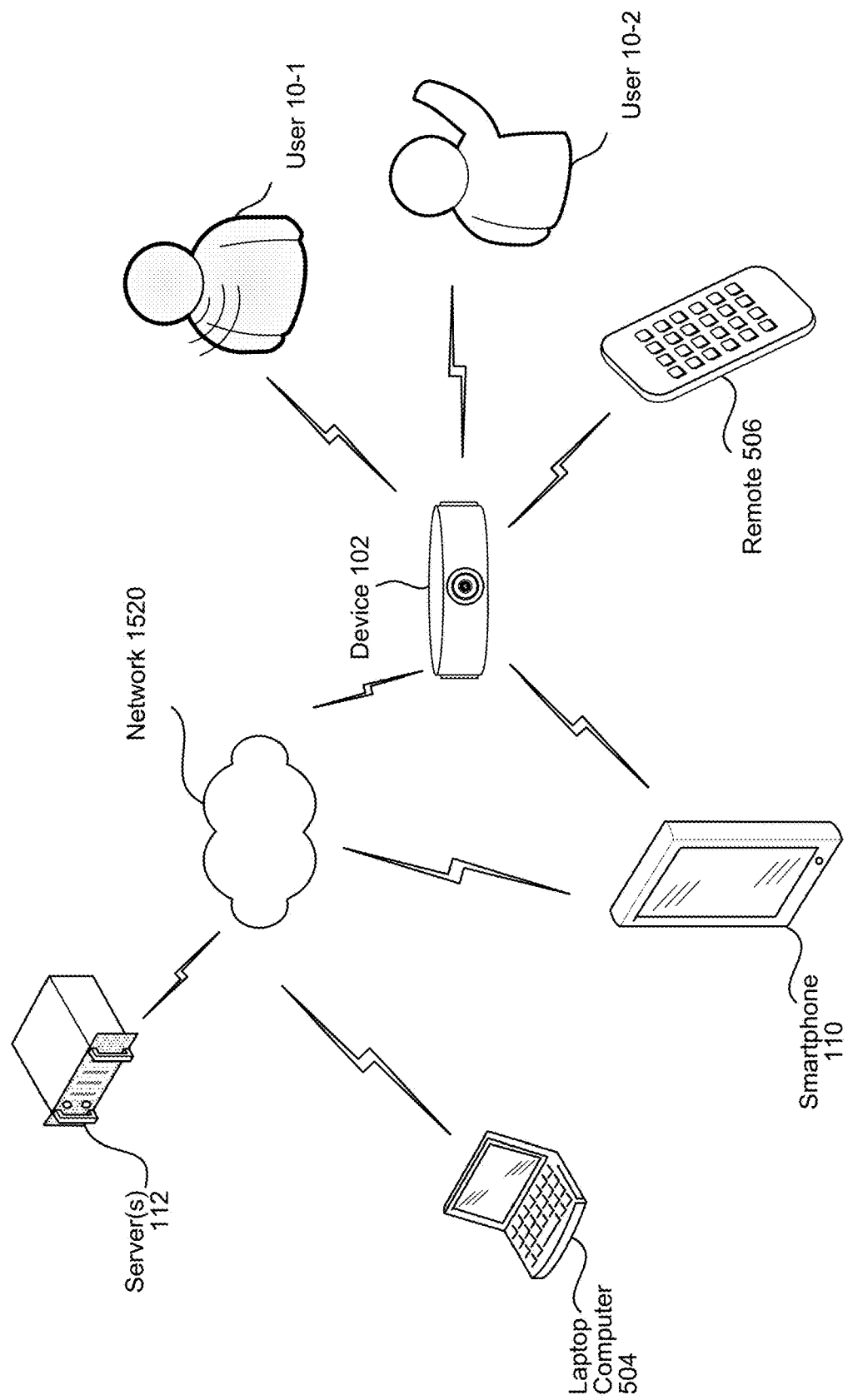
FIG. 5 illustrates an example of inputs to the device and communication paths between devices within the system according to embodiments of the present disclosure.

FIG. 5 illustrates an example of inputs to the device and communication paths between devices according to embodiments of the present disclosure. As illustrated in FIG. 5, the device 102 may receive multiple inputs. As an example of a first input, the device 102 may receive audio data from a microphone and the audio data may include a speech utterance from a first user 10-1. The device 102 may perform Automatic Speech Recognition (ASR), keyword spotting, or other techniques on the audio data to determine a command associated with the speech utterance and may perform the command. For example, the device 102 may generate a tag based on the command. Alternatively, the device 102 may upload the audio data to the server 112 and the server 112 may perform ASR on the audio data and generate tags based on the speech utterance.

As an example of a second input, the device 102 may receive video data from the camera(s) 104 and may analyze the video data for gestures and/or triggers as explained above. For example, the device 102 may determine that a second user 10-2 performed a gesture and may interpret the gesture as a command to generate a tag. Alternatively, the device 102 may identify a trigger included in the video data, such as a particular object or a particular face using facial recognition and may generate a tag associated with the trigger, as described in greater detail below.

As an example of a third input, the device 102 may receive a signal from a remote 506, such as an infrared signal. The signal may include inputted text or a command to generate a tag. Therefore, the remote 506 may be included with the device 102 to allow a user 10 to control the device 102 without requiring the smartphone 110 or other devices.

As an example of a fourth input, the device 102 may receive a signal directly from the smartphone 110, such as Bluetooth or other wireless signals. The smartphone 110 may be used to input types of tags, tag priorities, camera locations, guest lists, guest relationships, guest priorities and customized triggers as discussed in greater detail below with regard to FIG. 6. The device 102 may generate tags using the input from the smartphone 110, for example based on interactions with an application on the smartphone 110 linked to the device 102, etc. The device 102 may also generate tags in response to a user pressing a button on the device 102.

The server 112 may be remote to other devices and may be accessible over network 1520. For example, "cloud computing" techniques may make use include a number of servers in a remote facility and the server 112 may be an individual server processing the video data from the device 102. As illustrated in FIG. 5, the server 112 may receive multiple inputs from multiple devices. As a first example, the server 112 may receive video data and tags from the device 102. For example, the device 102 may generate the tags using the inputs described above and may upload the video data and the tags to the server 112 using a network connection. As a second example, the server 112 may receive inputs from the smartphone 110 and/or the laptop computer 504. For example, the smartphone 110 and/or the laptop computer 504 may be used to input types of tags, tag priorities, camera locations, guest lists, guest relationships, guest priorities and customized triggers as discussed in greater detail below with regard to FIG. 6. The server 112 may generate tags using the input from the smartphone 110 and/or laptop computer 504.

Figure 6:
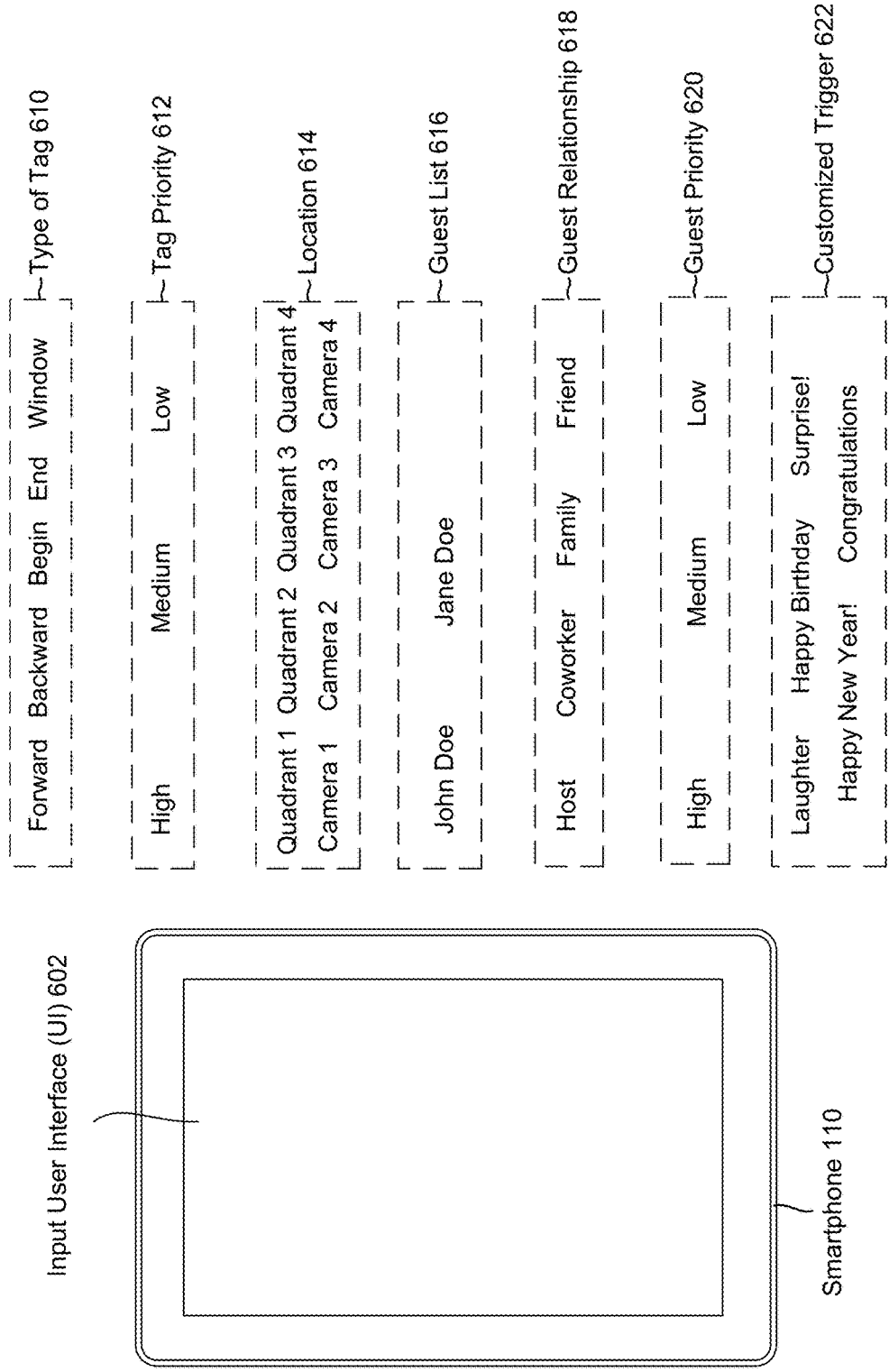
FIG. 6 illustrates an example of a customized input interface according to embodiments of the present disclosure.

FIG. 6 illustrates an example of a customized input interface according to embodiments of the present disclosure. As illustrated in FIG. 6, the smartphone 110 may display an input user interface (UI) 602 and may receive input from the user 10. For example, the input UI 602 may display and/or receive inputs related to a type of tag 610, a tag priority 612, a location 614, a guest list 616, a guest relationship 618, a guest priority 620 and/or a customized trigger 622.

The type of tag 610 may specify whether the tag is a forward tag, a backward tag, a begin tag, an end tag, a window tag or the like, as discussed in greater detail above with regard to FIG. 3. For example, a forward tag indicates a foreshadowing command and may be associated with video data subsequent to a timestamp of the forward tag; a backward tag indicates a backward tag command and may be associated with video data previous to a timestamp of the backward tag; the begin tag and the end tag indicate a start/stop command and may be associated with video data between a timestamp of the begin tag and a timestamp of the end tag; and the window tag indicates a window command and may be associated with one or more images centered at a particular moment in time within proximity to a timestamp of the window tag.

A tag priority 612 may indicate an importance of a tag. For example, a tag may be marked with high importance, medium importance, low importance or the like. Alternatively, the tag may be associated with an integer within a range, such as from 1 to 10, and the priority of the tag may be determined using the integer. Video data 106 associated with the tag may be included and/or featured in the edited video based on the tag priority 612. For example, a high priority tag may be used for video to definitely be included whereas the server 112 may determine whether to include a low priority tag. As another example, a high priority tag may include more video data than a low priority tag. Further, if the server 112 is generating multiple edited videos, a high priority tag may be included in each of the multiple videos while a low priority tag may be included only in a user-specific edited video. In addition to being received as part of a tag, a tag priority may be determined in a number of different ways. For example, individual users may be listed in a priority order in a user profile associated with the recording device 102. Tags from those users may be then given a priority based on the respective user priority in the user profile.

Figure 10A:
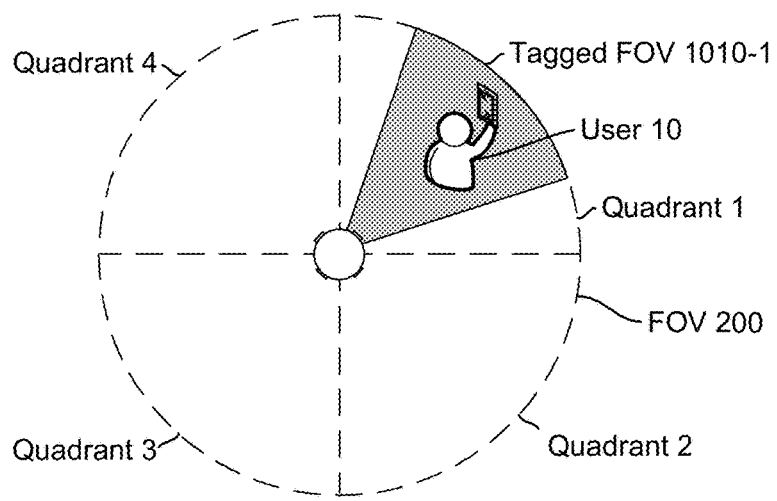
FIGS. 10A-10C illustrate examples of tagged field of views associated with tags according to embodiments of the present disclosure.
Figure 10B:
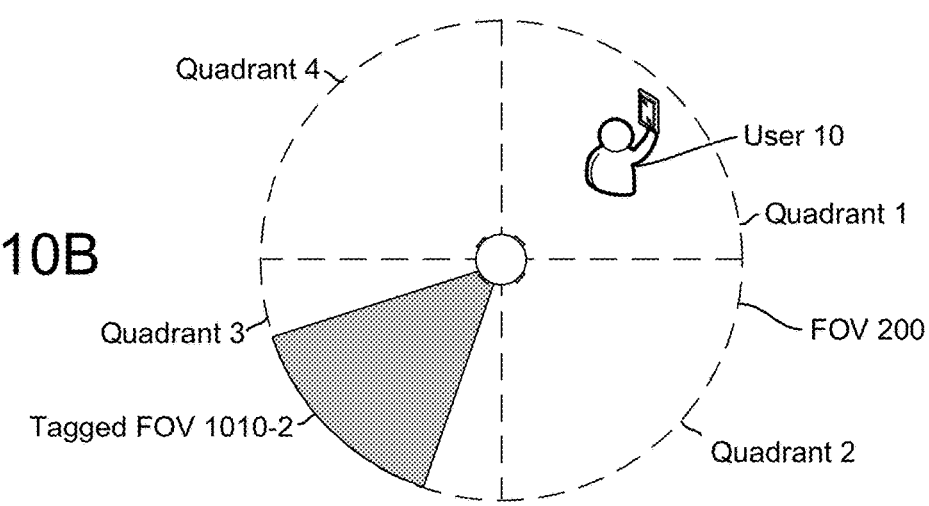
Figure 10C:
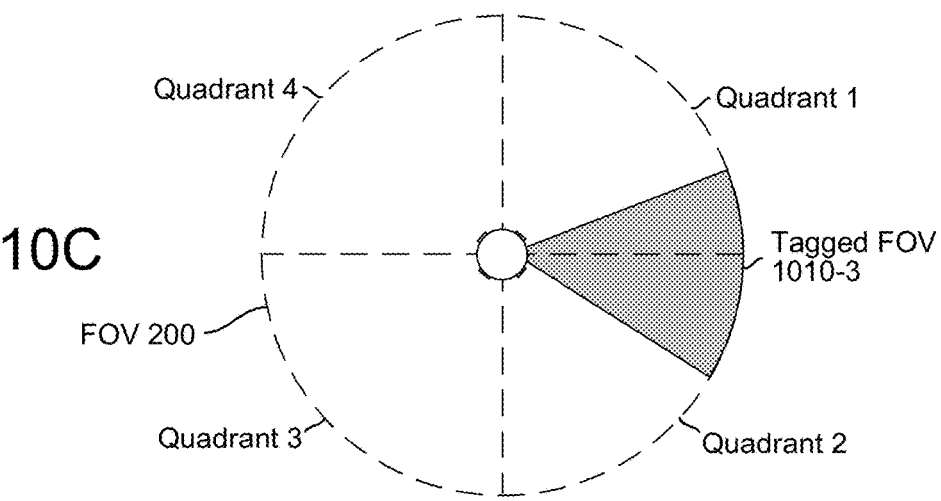

A location 614 may indicate an absolute or relative position to capture in the video data 106, as will be discussed in greater detail below with regard to FIGS. 10A-10C. For example, the location 614 may specify a particular section (e.g., Quadrant 1, Quadrant 2, Quadrant 3 and/or Quadrant 4) or a particular camera (Camera 1, Camera 2, Camera 3 and/or Camera 4). Alternatively, the location 614 may specify a specific region of the video data 106 associated with the tag. For example, the region may be a specific range of pixels of video data that represent the Quadrant of interest, or other portion of the scene that is of interest.

A guest list 616 may list guests identified in the video data 106 (by the device 102, the smartphone 110 and/or the server 112) or guests input by the user 10. The guest list 616 may be used to identify unique guests and ensure that each of the unique guests is included in the edited video. Alternatively, the guest list 616 may be used to identify specific guests so that the specific guests are featured in the edited video. For example, the host, birthday celebrant or other guest of honor may be identified and featured in the edited video.

The guest relationship 618 may identify a relationship of the guests in the guest list 616. In a first example, the guest relationship 618 may identify a relationship between a host of the event (or some other fixed guest of honor) and each of the guests in the guest list 616. Therefore, each guest may have a fixed relationship regardless of the user 10 creating the tag. In a second example, the guest relationship 618 may identify a relationship between each of the guests in the guest list 616 and the user 10. Therefore, the relationship of each guest may vary between different users.

The guest priority 620 may identify a relative importance of each guest. For example, close family may have a high importance to the user, friends and coworkers may have a medium importance to the user while casual acquaintances or staff catering or hosting the event may have a low importance to the user. Based on the guest priority 620, guests having high importance may be included in the edited video at a greater frequency than guests of medium importance and low importance. The guest priority 620 may be directly input by the user or may be derived from the guest relationship 618. Therefore, the guest relationship 618 and the guest priority 620 may be used to feature important guests (e.g., close family and friends) in the edited video and to reduce an importance of less important guests (e.g., acquaintances and staff catering or hosting the event).

The smartphone 110 may acquire data associated with the guest list 616, the guest relationship 618, the guest priority 620 or the like by acquiring information from a social media or social networking database. For example, the smartphone 110 may access information associated with a user of the smartphone 110 from a Facebook account, an Amazon user profile, an email account or the like. However, the present disclosure is not limited to thereto, and the server 112 and/or device 102 may acquire data from the social media or social networking database without departing from the present disclosure.

The customized trigger 622 indicates certain triggers that may be used to generate tags, as will be discussed in greater detail below with regard to FIG. 14. For example, the device 102 and/or the server 112 may analyze the video data 106 and generate a tag using the customized trigger 622. Examples of customized triggers include audio and/or object tracking. FIG. 6 illustrates examples of audio triggers, such as laughter, "Happy Birthday," "Surprise!," "Happy New Year!" and "Congratulations."

While the disclosure illustrates a number of examples involving the device 102 capturing video data at a party, the present disclosure is not limited thereto and many other configurations/events are possible. For example, the device 102 may capture video data at sporting events, lectures, meetings, musical performances, theater productions or the like. In addition, the device 102 may capture video data from unusual perspectives (e.g., placed on stage during a theater production) or from fixed locations (e.g., placed on a front desk in an office, on a guest table at a wedding or in a hallway in a residential home). When placed in fixed locations, the device 102 may use motion detection or the like to capture video data only when movement is detected. For example, when the device 102 is placed at a fixed location in a residential home, the device 102 may capture video data over the course of a long period of time (e.g., days, weeks, months, etc.) and a video summary may be generated that summarizes the long period of time, capturing family moments, growth of children, visits from guests or the like. In addition, the device 102 may provide a simple way for guests/family to leave video messages.

A video summarization may be stored by server 112 and sent to individual smartphones 110. Alternatively, the server 112 may send links (such as hyperlinks or similar data) to devices 102 enabling access to the video summarization using the link. Alternatively, the server may send the link to a device or communication address (such as an email address, text message number, etc.) associated with a user profile. The user profile may be associated with a received tag, device 102, smartphone 110, etc. The same video summarization (or links thereto) may be sent to multiple users or customized video summarizations (or links thereto) may be prepared and sent to different users.

Figure 7:
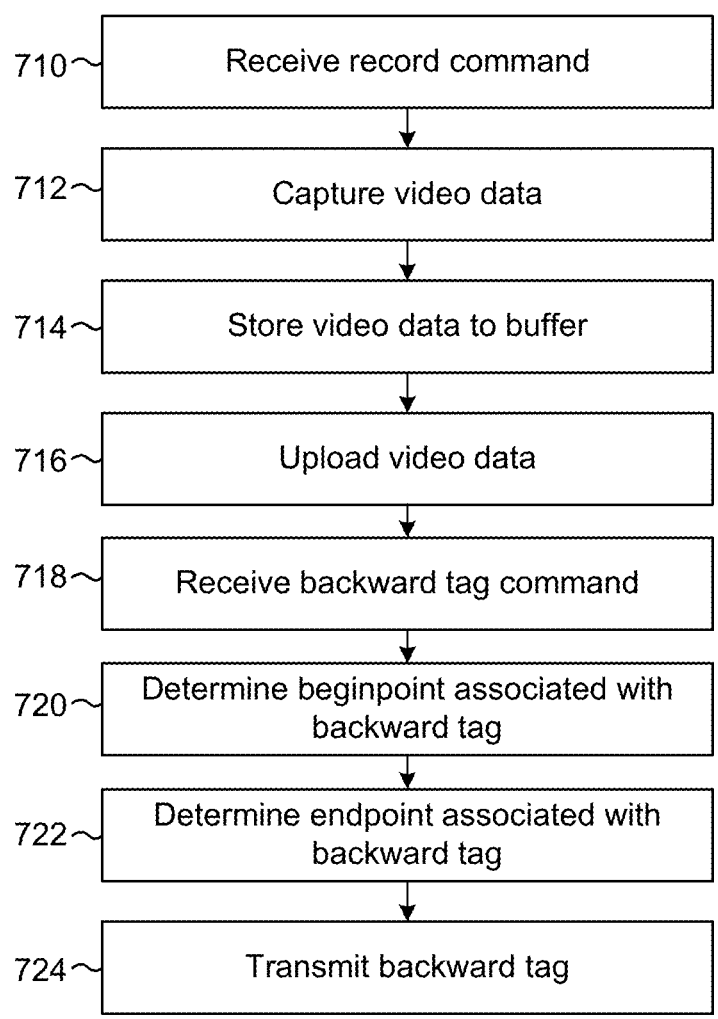
FIG. 7 is a flowchart conceptually illustrating an example method for generating a backward tag during a recording mode according to embodiments of the present disclosure.

FIG. 7 is a flowchart conceptually illustrating an example method for generating a backward tag during a recording mode according to embodiments of the present disclosure. As the device 102 is recording video data during the recording mode, a user 10 may use the backward tag to retroactively tag a moment in previously captured video data. For example, during a party the device 102 may be recording video data while a noteworthy moment occurs. At the conclusion of the moment, a user 10 may instruct the device 102 to generate a backward tag associated with the moment and the device 102 may determine a beginpoint and an endpoint associated with the backward tag to include the moment.

As illustrated in FIG. 7, the device 102 may receive (710) a record command, may capture (712) video data, may store (714) the video data to a buffer and may upload (716) the video data to the server 112. For example, a user 10 may place the device 102 in position to capture an event and may begin recording of the device 102. During recording, the device 102 may continually capture, store and upload the video data throughout the event. Therefore, while steps 712-716 are illustrated in FIG. 7 as discrete steps, the disclosure is not limited thereto. Instead, the device 102 may continue to capture, buffer and upload the video data while the device 102 is performing other steps. Therefore, steps 712-716 may be performed concurrently or substantially simultaneously to the other steps illustrated in FIG. 7.

The device 102 may store the video data in a buffer prior to uploading the video data. For example, the buffer may be sized so that the device 102 may capture a length of time before uploading the video data. Alternatively, the device 102 may upload the video data without storing the video data in the buffer.

While capturing and uploading the video data, the device 102 may receive (718) a backward tag command. The backward tag command may instruct the device 102 to generate a backward tag, which may be associated with video data previous to a timestamp of the backward tag command. The device 102 may determine (720) a beginpoint associated with the backward tag, may determine (722) an endpoint associated with the backward tag and may transmit (724) the backward tag to the server. The device may also send an indication of the beginpoint and endpoint either separately or as part of the backward tag or embedded in the video data. The video data associated with the backward tag may extend between the beginpoint and the endpoint. The device 102 may determine the beginpoint and endpoint based on user preferences and/or user input associated with the backward tag command. For example, the device 102 may determine the beginpoint and/or endpoint based on a fixed duration of time for all backward tags, a variable duration of time specified by the backward tag, an audio energy level falling below a threshold prior to or subsequent to the timestamp associated with the backward tag command, when no movement was detected in the video data for a duration of time prior to or subsequent to the timestamp associated with the backward tag or the like. Thus, the backward tag may begin at a first moment in time prior to when the backward tag command was received and may extend until a second moment in time, such as when the backward tag was received or later.

In one example, the device 102 may capture a guest giving a speech and receive the backward tag command at the conclusion of the speech. Therefore, the device 102 may determine the beginpoint as the beginning of the speech, for example based on the audio or motion associated with the video data as discussed in greater detail below with regard to FIG. 9, and may determine the endpoint as the moment the backward tag command was received. In another example, the device 102 may capture a guest giving a speech and receive the backward tag command during the speech. Therefore, the device 102 may determine the beginpoint as discussed above and may determine the endpoint as the end of the speech, for example based on the audio or motion associated with the video data subsequent to the moment the backward tag command was received.

While FIG. 7 illustrates steps 720 and 722 being performed by the device 102, the present disclosure is not limited thereto. Instead, the device 102 may transmit the backward tag and a timestamp and the server 112 or other remote devices may perform steps 720 and 722 to determine the beginpoint and endpoint associated with the backward tag. For example, the device 102 may receive the backward tag command at a first moment in time and may upload the backward tag at the first moment in time, and the server 112 may analyze the video data to determine the beginpoint and endpoint associated with the backward tag that include the first moment in time.

Alternatively, the smartphone 110 may perform steps 718, 720, 722 and/or 724 to transmit the backward tag. In a first example, the smartphone 110 may receive the backward tag command in step 718 and may transmit the backward tag in step 724, and the server 112 may perform steps 720 and 722 to determine the beginpoint and the endpoint associated with the backward tag using the video data. In a second example, the smartphone 110 may receive the backward tag command in step 718, may determine the beginpoint and the endpoint associated with the backward tag based on user input and may transmit the backward tag to the server 112.

When a user 10 plans ahead to capture video data of an event, the user 10 may instruct the device 102 to operate in recording mode and the device 102 may upload video data to the server 112 on an ongoing basis. As the device 102 is already uploading the video data, when the device 102 receives the backward tag command the device 102 may transmit a backward tag associated with the existing uploaded video data. However, in some situations the device 102 may not be in recording mode when an event occurs and the user 10 may wish to capture video data of the event after the fact. For example, the device 102 may be in standby mode (e.g., not uploading video data) when a baby begins to walk for the first time. Despite being in standby mode, the device 102 may capture video data of the baby's first steps and store the video data to a buffer. Shortly after the event occurs (e.g., the baby stops walking), the user 10 may wish to save the video data of the event and thus may send a command (for example from a smartphone or by pressing a button on the device) to the device 102 to create a tag to save/select the recently buffered video. The device 102 may receive and/or generate the tag, determine the video data associated with the tag, and upload the video data to the server 112.

Figure 8:
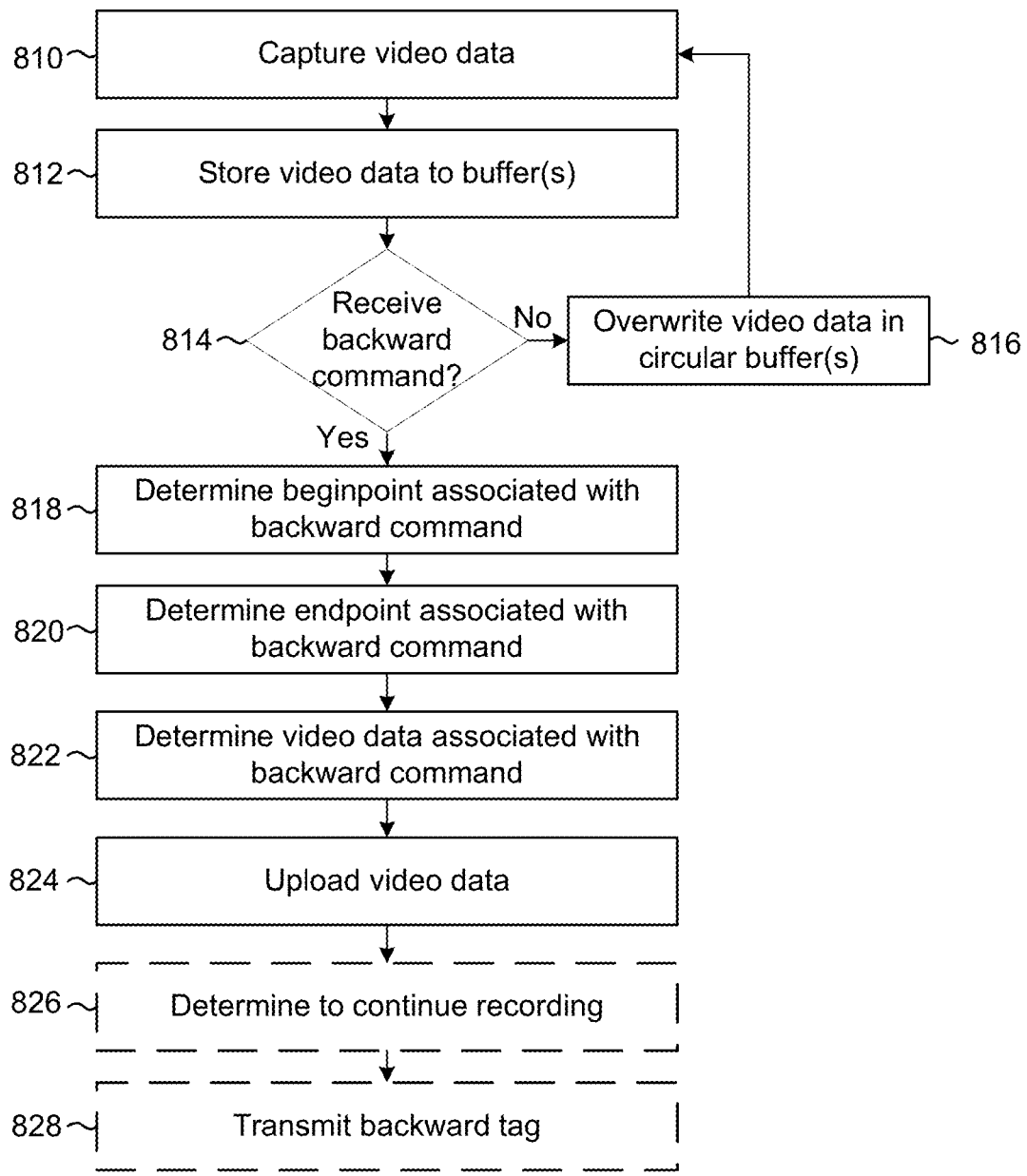
FIG. 8 is a flowchart conceptually illustrating an example method for generating a backward tag during a standby mode according to embodiments of the present disclosure.

FIG. 8 is a flowchart conceptually illustrating an example method for generating a backward tag during a standby mode according to embodiments of the present disclosure. The device 102 may capture (810) video data and may store (812) the video data to one or more buffers. For example, the device 102 may continuously capture video data and may store the video data to a circular buffer of a certain size. When the video data exceeds the size of the circular buffer, the newest video data may overwrite the oldest video data, so that the circular buffer captures the most recent duration of time. The most recent duration of time (e.g., an amount of video data stored in the circular buffer) may be based on hardware limitations or may be determined based on user preferences. For example, the device 102 may store five minutes of video data in the circular buffer, allowing the user 10 to retroactively record up to five minutes after an event occurs.

The device 102 may determine (814) if a backward tag command is received by the device 102. If the device 102 does not receive the backward tag command, the device may overwrite (816) the video data in the circular buffer and continue capturing and buffering video data. If the device 102 receives the backward tag command, the device may determine (818) a beginpoint associated with the backward tag command and may determine (820) an endpoint associated with the backward tag command, as discussed above with regard to FIG. 7. The device 102 may determine (822) video data associated with the backward tag command and may upload (824) the video data. For example, the device 102 may determine the beginpoint and the endpoint and may determine the video data stored in the buffer associated with the beginpoint and the endpoint.

Optionally, the device 102 may determine (826) to continue recording. For example, the device 102 may determine that additional video data should be captured and uploaded to the server 112. If the device 102 determines to continue recording, the device 102 may transmit (828) a backward tag indicating the beginpoint and the endpoint determined in steps 818 and 820.

While FIG. 8 illustrates steps 818 and 820 being performed by the device 102, the present disclosure is not limited thereto. Instead, the device 102 may upload the video data included in the buffer and the server 112 may perform steps 818, 820 and/or 822 to determine the beginpoint, the endpoint and the video data associated with the backward tag. For example, the device 102 may receive the backward tag command at a first moment in time and may upload the backward tag and the video data at the first moment in time, and the server 112 may analyze the video data to determine the beginpoint and endpoint associated with the backward tag that include the first moment in time.

FIG. 9 illustrates an example of determining a beginpoint and an endpoint associated with the backward tag according to embodiments of the present disclosure. As discussed above, the device 102 may capture audio data associated with the video data using microphone(s). For ease of illustration, FIG. 9 illustrates analyzing an audio waveform to determine the beginpoint and the endpoint associated with the backward tag. However, the disclosure is not limited thereto and the video data may be analyzed using similar methods.

As illustrated in FIG. 9, buffer data 912 may include audio waveforms corresponding to first audio data 914 and second audio data 918, which are separated by a pause 916. For example, the first audio data may correspond to a first sentence of speech and the second audio data may correspond to a second sentence of speech. During the second sentence, the device 102 may receive a backward tag command 902 and may generate a backward tag at location $T_{RetroTag}$ 926 on a timeline 922. In response to receiving the backward tag command 902, the device 102 may perform beginpoint detection (also called beginpointing) to determine a beginpoint indicating when the event associated with the backward tag began. For example, the device 102 may identify the pause 916 separating the first sentence from the second sentence and may determine that the beginpoint corresponds to the pause 916.

In this example, the device 102 may determine the beginpoint by identifying pauses in the speech that correspond to silent periods in the audio data. The device 102 may compare the length of each pause to a threshold length, where the threshold length represents a likelihood that a pause of the threshold length represents a break between utterances. As illustrated, the device 102 may determine that only pause 916 has a length exceeding the threshold, while the other pauses have lengths that do not exceed the threshold (and thus may represent breaks within a same utterance, for example pauses between words). The device may mark the location of the pause, where the location may include the start and stop points of the pause, a center point of the pause, etc. As illustrated in FIG. 9, the device may mark the center of the pause at location $T_{beginpoint}$ 924. The location may be marked relative to a timestamp associated with the video data, according to a location in the buffer of the pause 916, or in some other manner relative to the video data in the buffer and/or the video data. The location may be marked in the buffer itself or separately stored in memory/storage for later retrieval by the device. Other methods of beginpointing, such as voice activity detection (VAD), or other techniques known in the art, may be used.

Using the backward tag command, the user 10 may retroactively capture video data associated with the backward tag. As illustrated in FIG. 9, the user 10 instructed the device 102 to retroactively capture video data corresponding to a missed duration of time 930 prior to inputting the backward tag command 902. While FIG. 9 illustrates the device 102 determining the beginpoint based on the pause 916, the backward tag may be associated with a fixed duration of time and therefore the missed duration of time 930 may be consistent between backward tags.

For ease of explanation, FIG. 9 illustrates a simple example of separating two sentences based on the audio waveforms, but the disclosure is not limited thereto. Instead, the device 102 may separate multiple sentences or concurrent audio waveforms including multiple pauses to identify a beginning of an event. For example, the pause 916 may coincide with a user 10 standing up to address other guests, and the device 102 may associate the second audio data 918 with the speaker addressing the guests. The device 102 may determine that the pause 916 corresponds to a beginning of the speaker addressing the guests even if the backward tag command 902 is received after multiple pauses in the speech that exceed the threshold. For example, the device 102 may analyze patterns in the buffer data 912, perform audio recognition to identify the speaker's voice and/or analyze corresponding video data to identify when the speaker stood up based on motion detection.

Once the beginpoint is determined, the device 102 may perform endpoint detection (also called endpointing) to determine when the event associated with the backward tag has concluded. The process for endpointing may be similar to the process for beginpointing processing discussed above. For example, in known endpoint detection approaches, a speech endpoint detection algorithm may determine if an utterance has terminated based on the number of silence/non-speech audio frames, for instance the number of consecutive silence/non-speech frames. Energy based or acoustic model based voice activity detection (VAD) may be used in these algorithms. The utterance may be deemed ended when the voice activity detector sees a certain number of non-speech audio frames. Machine learning techniques may also be used for endpointing. As with initial detection of speech, endpoint determination may be performed by determining an energy level of the audio input. As illustrated in FIG. 9, the device may mark the endpoint at location $T_{endpoint}$ 928.

After determining the beginpoint at location $T_{beginpoint}$ 924 and the endpoint at $T_{endpoint}$ 928, the device 102 may determine video data 932 associated with the backward tag and may upload the video data 932 to the server 112.

While FIG. 9 is intended to illustrate the device 102 determining the beginpoint and endpoint and corresponding video data to upload to the server 112, the disclosure is not limited thereto. Instead, similar methods may be used by the server 112 to determine a beginpoint and an endpoint and corresponding video data corresponding to a backward tag received from the device 102 and/or smartphone(s) 110.

As discussed above with regard to FIG. 2, the device 102 may, using multiple cameras, capture video data in a 360 degree field of view. In some situations, an event may occur in multiple directions and the entire field of view may be associated with a tag. However, in some situations a particular location within the field of view may be associated with the tag. FIGS. 10A-10C illustrate examples of tagged field of views associated with tags according to embodiments of the present disclosure.

Many tags are associated with direction data for a user 10 inputting the tag. For example, gestures may be used to generate a tag and a location of the gesture may be determined based on a location of the user 10 within the FOV 200. Similarly, speech may be used to generate a tag and a location of the user 10 may be determined using beamforming and/or by identifying the user 10 using speech recognition and determining a location of the user 10 using facial recognition. Likewise, a remote control with directional input (e.g., infrared (IR) signals) may be used to generate a tag and a location of the remote control 506 may be determined based on the receiver on the device 102 that received the directional input. In some examples, a smartphone 110 may be used to generate a tag and a location of the smartphone 110 may be included as input in the tag or may be determined based on facial recognition of the user 10 associated with the smartphone 110.

In some examples, the direction data associated with the user 10 inputting the tag may be used to determine a location associated with the tag. As illustrated in FIG. 10A, a user 10 may be in Quadrant 1 of the field of view (FOV) 200 and a tag input by the user may be associated with a first tagged FOV 1010-1 that includes the user 10 and a portion of Quadrant 1. For example, the user 10 may want to capture a moment and may input the tag while holding up a gift for the camera. The tag may identify a region of video data associated with the location. For example, a small region within the video data may be associated with a tag. The region may be a specific range of pixels of video data that represent the portion of the scene that is of interest, for example as specified in the tag or other indication. The region may be a subset of the image data captured at a given time (from how every many cameras are operating) and may be configured based on a desired display resolution. For example, the region may be a high definition (HD) resolution image (e.g., 1080) or the equivalent of a single camera view selected from a panoramic/360 degree view provided by multiple cameras.

However, in some examples the direction data associated with the user 10 inputting the tag does not correspond with a location associated with the tag. FIG. 10B illustrates the user 10 in Quadrant 1 of the FOV 200 while a tag input by the user 10 is associated with a second tagged FOV 1010-2 including a portion of Quadrant 3. For example, the user 10 may want to capture a moment across from the user 10 or a particular location of an event that does not include the user 10, such as another guest unwrapping a gift.

Further, some tags may not be associated with direction data. For example, beamforming associated with speech may not be reliable in certain situations, some wireless inputs lack directional input (e.g., Bluetooth signals), a button on the device 102 may be pressed, the device 102 may generate a tag based on a customized trigger, or the tag may be input to the server 112 by a smartphone 110 or a laptop computer 504. FIG. 10C illustrates a tag without direction data for the user 10 while the tag is associated with a third tagged FOV 1010-3 including portions of Quadrant 1 and Quadrant 2.

In some situations, a location associated with the tag may be input by the user 10. For example, the device 102 may interpret different gestures as corresponding to different locations; the device 102 may identify a location based on the user 10 pointing; the device 102 may identify a location based on a command included in speech (e.g., "Quadrant 1") when the tag command is received; or the device 102, remote control 506, smartphone 110 and/or laptop computer 504 may include multiple buttons that allow the user 10 to identify a location associated with the tag. The input may be simple (e.g., allowing the user 10 to associate the tag with a location of the user 10) or complicated (e.g., allowing the user 10 to associate the tag with a particular field of view). Alternatively, the device 102 and/or server 112 may automatically identify a location associated with the tag using one of several techniques. For example, the device 102/ server 112 may identify a location based on motion detection, beamforming, facial recognition, object recognition or the like.

Figure 11:
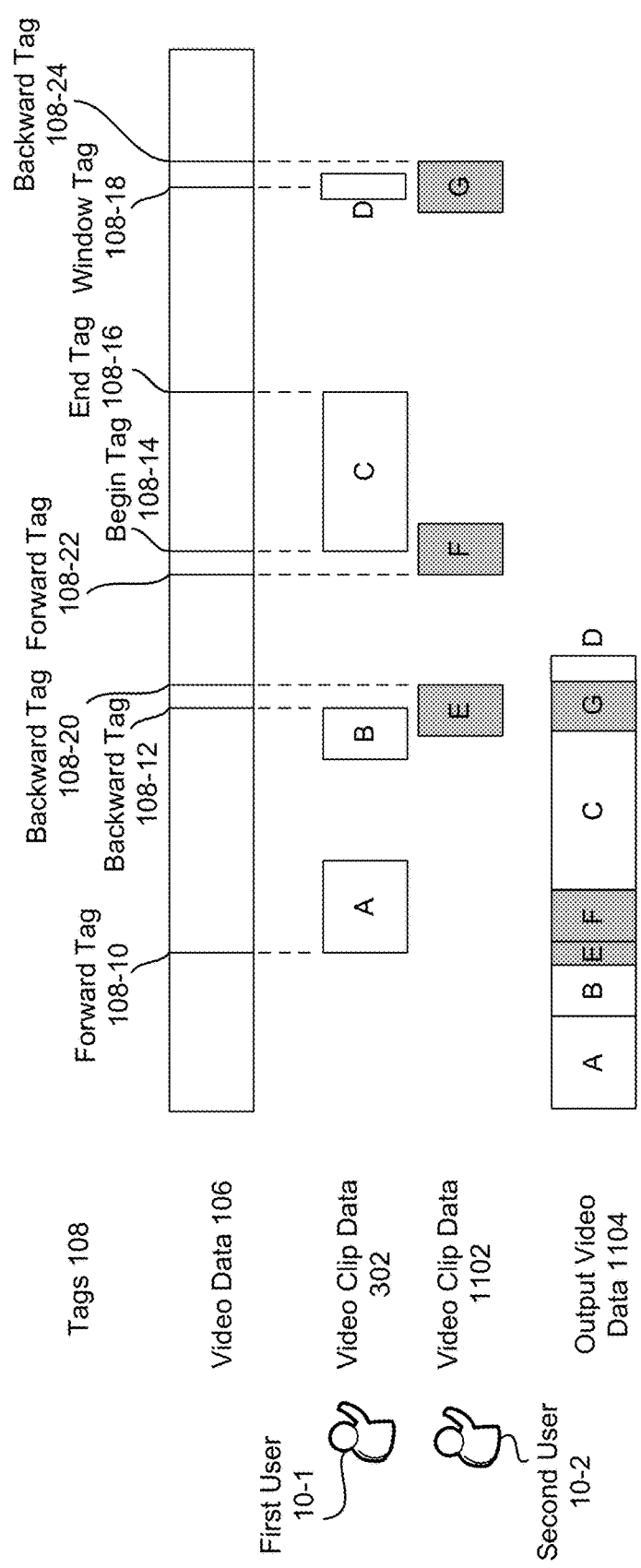
FIG. 11 illustrates an example of generating an edited video clip using tags from multiple users according to embodiments of the present disclosure.

As discussed above with regard to FIG. 3, the server 112 may generate an edited video clip using tags received from a single user. However, the disclosure is not limited thereto and the server 112 may generate an edited video clip using tags received from multiple users. FIG. 11 illustrates an example of generating an edited video clip using tags from multiple users according to embodiments of the present disclosure.

As illustrated in FIG. 11, the tags 108 may be associated with specific moments within the video data 106, and the server 112 may use tags 108-1x from a first user 10-1 to determine first video clip data 302 and tags 108-2x from a second user 10-2 to determine second video clip data 1102. The server 112 may then generate output video data 1104 including at least portions of the first video clip data 302 and the second video clip data 1102.

For example, the forward tag 108-10, backward tag 108-12, begin tag 108-14, end tag 108-16 and window tag 108-18 may be associated with the first user 10-1 and the server 112 may determine the first video clip data 302 as discussed above with regard to FIG. 3. In addition, the second user 10-2 may generate a backward tag 108-20, forward tag 108-22 and backward tag 108-24 and the server 112 may associate these tags with video clip data 1102-E, video clip data 1102-F and video clip data 1102-G. The video clip data 1102-E associated with the backward tag 108-20 may extend backward from the backward tag 108-20 and may overlap a portion of the video clip data 302-B. The video clip data 1102-F associated with the forward tag 108-22 may extend forward from the forward tag 108-22 and may overlap a portion of the video clip data 302-C. The video clip data 1102-G associated with the backward tag 108-24 may extend backward from the backward tag 108-24 and may overlap the entirety of video clip data 302-D. The server 112 may determine a beginpoint and endpoint associated with each of the video clip data 1102 using the techniques discussed in greater detail above with regard to FIG. 3.

To generate the output video data 1104, the server 112 may combine the video clip data 302 and the video clip data 1102 depending on the tags 108 generated by the first user 10-1 and the second user 10-2. In a first example, video clip data 302-B and video clip data 1102-E may include the same field of view and therefore the output video data 1104 may include video data between a beginpoint associated with the video clip data 302-B and an endpoint associated with the video clip data 1102-E. Thus, an entirety of the video clip data 302-B and only a portion of the video clip data 1102-E (e.g., video data not included in video clip data 302-B) may be included. In a second example, video clip data 1102-F and video clip data 302-C may include different field of views and therefore the output video data 1104 may include video clip data 1102-F followed by video clip data 302-C. Thus, a portion of time may be repeated using two different field of views. In a third example, video clip data 1102-G may include a different perspective than video clip data 302-D associated with the window tag 108-18; therefore the output video data 1104 may include video clip data 1102-G followed by video clip data 302-D. Thus, a video may be included followed by a window of images surrounding (or a single image at) a particular moment taken during the video.

While FIG. 11 illustrates the output video data 1104 combining video clip data 302 from a first user 10-1 and video clip data 1102 from a second user 10-2, the disclosure is not limited thereto. Instead, the output video data 1104 may combine video data from multiple users and/or may omit some of the video data associated with a tag 108. For example, the server 112 may determine a priority of video clip data based on the tags 108 and may omit video clip data associated with tags of low priority, only tagged by a single user, or the like.

Figure 12:
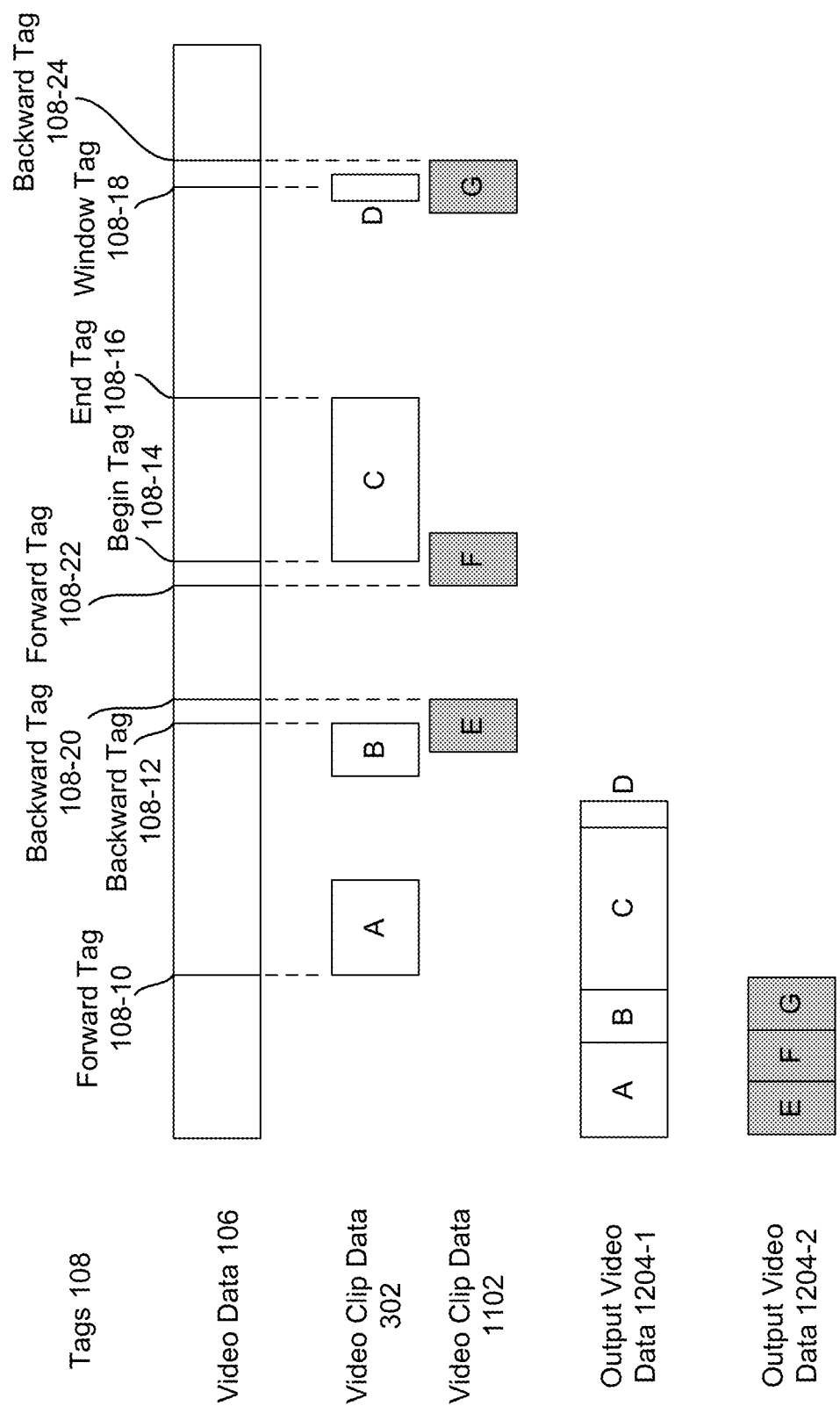
FIG. 12 illustrates an example of generating multiple edited video clips using tags from multiple users according to embodiments of the present disclosure.

In addition to creating a single edited video based on multiple tags 108 received from multiple users, the server 112 may generate multiple edited videos from the same video data 106. FIG. 12 illustrates an example of generating multiple edited video clips using tags from multiple users according to embodiments of the present disclosure. For ease of explanation, a description of elements discussed above with regard to FIG. 3 and/or FIG. 11 will be omitted.

As illustrated in FIG. 12, the server 112 may generate first output video data 1204-1 using tags 108 received from the first user 10-1 and may generate second output video data 1204-2 using tags 108 received from the second user 10-2. Therefore, a single device 102 may capture video data 106 and the server 112 may generate multiple edited videos including different portions of the video data 106. Thus, each user 10 may generate a personalized edited video specifically tailored to them.

However, while FIG. 12 illustrates the first output video data 1204-1 only including video data associated with tags 108 received from the first user 10-1, the present disclosure is not limited thereto. Instead, the first output video data 1204-1 may include video data associated with tags 108 received from the first user 10-1, the second user 10-2 and additional users without departing from the present disclosure. Thus, the first output video data 1204-1 may include video data associated with tags 108 from multiple users while the second output video data 1204-2 may only include video data associated with tags 108 received from the second user 10-2. As a result, the server 112 may generate a personalized edited video for each user 10 including video data associated with their own tags 108 as well as video data associated with other users' tags 108. In addition, the server 112 may generate an event-wide edited video including video data associated with a majority of users 10.

Figure 13:
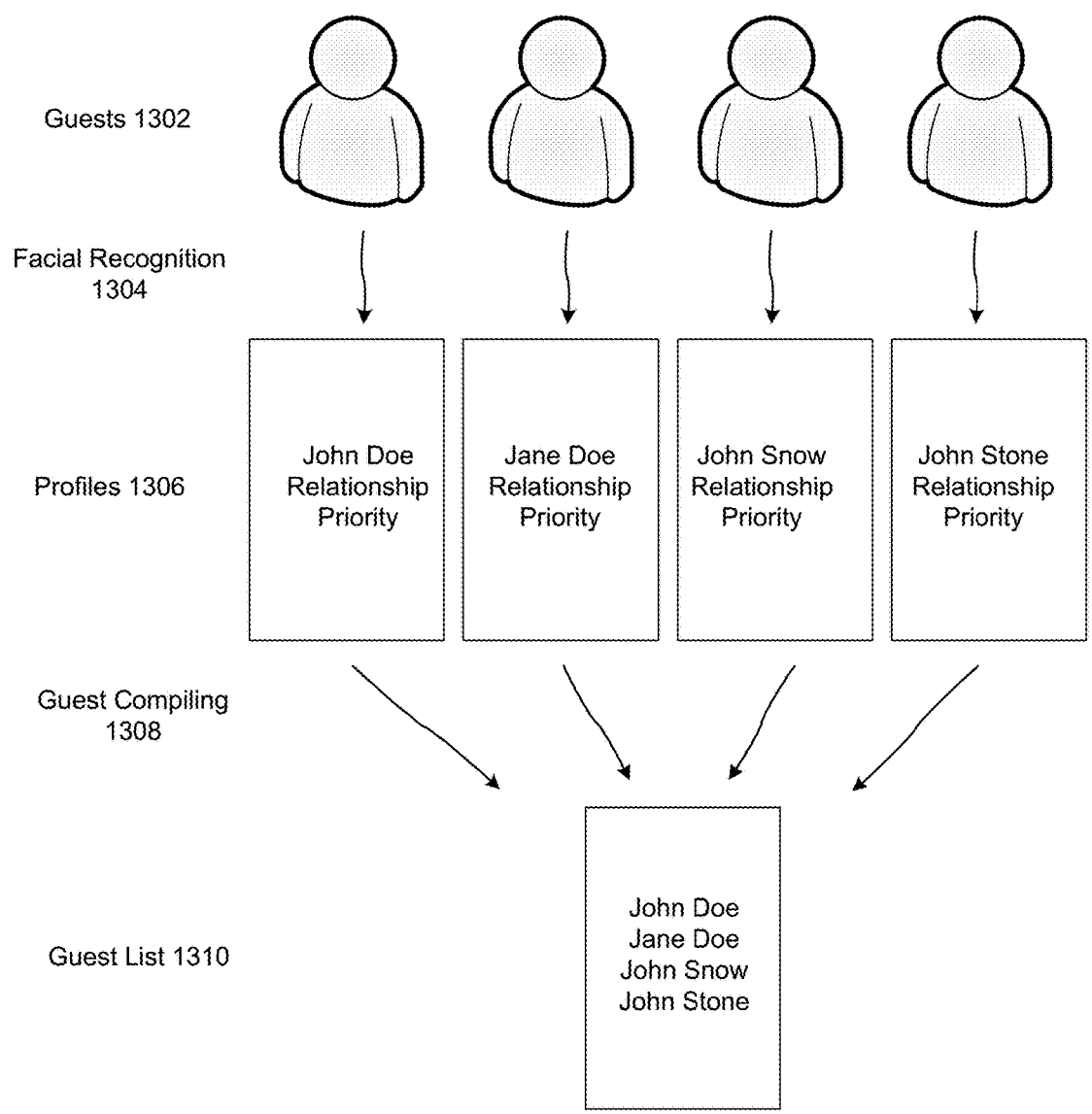
FIG. 13 illustrates using facial recognition processing to generate a guest list and provide additional features according to embodiments of the present disclosure.

FIG. 13 illustrates using facial recognition processing to generate a guest list and provide additional features according to embodiments of the present disclosure. While FIG. 13 illustrates facial recognition processing being performed, the disclosure is not limited thereto. Instead, the device 102 and/or server 112 may identify unique guests using other identification techniques, including speaker recognition, user identification associated with a guest's smartphones, user input or the like without departing from the present disclosure.

As illustrated in FIG. 13, guests 1302 may be captured in the video data and the server 112 may use facial recognition 1304 to determine unique guests and generate corresponding profiles 1306. The profiles may include information input by the user, as discussed in greater detail above with regard to FIG. 6, such as a relationship between the guest and the user or a guest of honor along with a priority of the guest. By generating the profiles 1306, the server 112 may perform guest compiling 1308 and create a guest list 1310 identifying the guests visible in the video data.

In some examples, the server 112 may use the profiles 1306 to generate tags associated with individual guests. For example, the server 112 may attempt to include each of the individual guests in the final edited video and may generate tags for individual guests that are not included in video data associated with existing tags. Further, the server 112 may use the profiles 1306 to determine which tags to include in an edited video for a user. For example, the server 112 may identify particular guests 1302 having a close relationship to a first user 10-1 and may include video data associated with tags 108 that were not generated by the first user 10-1 but that include the particular guests. Alternatively, the first user 10-1 may indicate a negative relationship with a particular guest and the server 112 may exclude video data that includes the particular guest.

FIG. 14 illustrates an example of customized triggers used to generate tags according to embodiments of the present disclosure. The user 10 may input customized triggers using a smartphone 110 and the device 102 and/or server 112 may generate tags using the customized triggers. Examples of customized triggers include audio triggers (e.g., a certain phrase is identified in audio associated with the video data), object tracking (e.g., a certain object is identified in the video data), gesture tracking (e.g., a user performs a certain action) and/or facial recognition (e.g., a certain guest is identified in the video data).

The customized triggers may be input to the device 102 and/or server 112 before, during or after the event. The device 102 and/or server 112 may use the customized trigger's input to generate tags automatically without user involvement. For example, when the device 102 is capturing a dinner party, the dinner party trigger 1402 may be input and tags may be generated in response to laughter being identified in the audio (e.g., laughter after a funny story may trigger a backward tag command and a backward tag may be generated associated with the funny story) or a host or hostess being identified in the video data using facial recognition. As another example, when the device 102 is capturing a birthday party, the birthday party trigger 1404 may be input and tags may be generated in response to the phrases "Happy Birthday!" or "Surprise!" being identified in the audio, birthday cake being identified in the video data, an act of opening gifts being identified in the video data or the birthday celebrant being identified in the video data using facial recognition.

When the device 102 is capturing a New Year's party, the New Year's Party trigger 1406 may be input and tags may be generated in response to the phrase "Happy New Year!" being identified in the audio, an act of kissing being identified in the video data or the host or hostess being identified in the video data. Finally, when the device 102 is capturing a wedding reception, the wedding reception trigger 1408 may be input and tags may be generated in response to the phrases "Congratulations" or "Mr. and Mrs.", wedding cake being identified in the video data or the bride and groom being identified in the video data using facial recognition.

While FIG. 14 illustrates several examples of customized triggers, the disclosure is not limited thereto and the user 10 may input customized triggers based on the occasion or the event being captured. For example, particular guests or phrases may be input as a customized trigger and tags may be generated based on the particular guests or phrases.

Figure 15A:
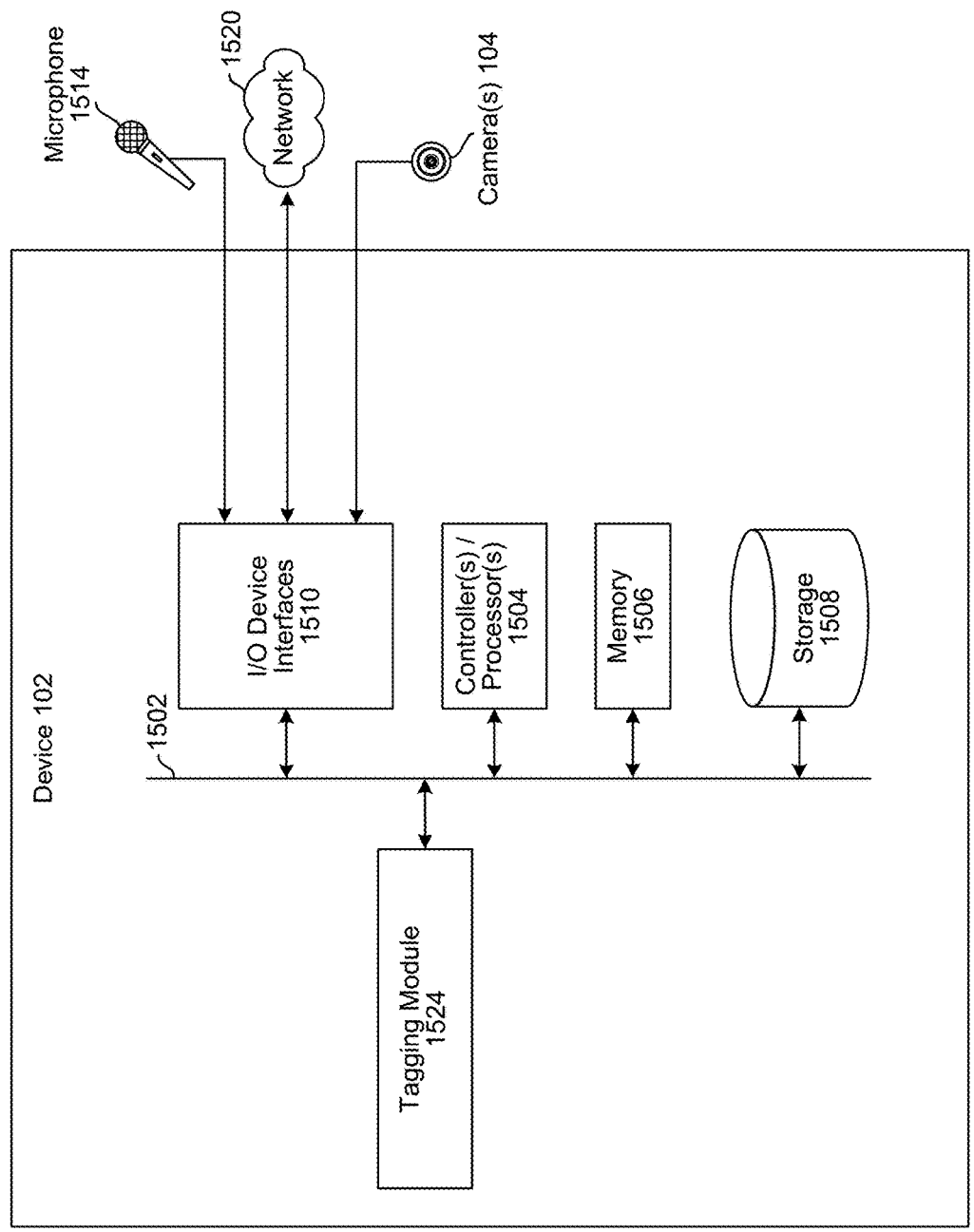

FIGS. 15A-15B illustrates block diagram conceptually illustrating example components of a system 100 including a local device, such as device 102, and/or a remote device, such as a server 112. Multiple such remote devices may be included in the system, such as one remote device for video editing, one remote device for Automatic Speech Recognition (ASR), one remote device for Natural Language Understanding (NLU), etc. Other components not illustrated may also be included in the device 102/server 112. In operation, the system 100 may include computer-readable and computer-executable instructions that reside in storage 1508 on the device 102/server 112. The device 102 may be an electronic device capable of recording video data and uploading the video data to the server 112. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102 may also be a component of any of the abovementioned devices or systems.

As illustrated in FIGS. 15A-15B, the device 102/server 112 may include an address/data bus 1502 for conveying data among components of the device 102/server 112. Each component within the device 102/server 112 may also be directly connected to other components in addition to (or instead of) being connected to other components across the bus 1502.

The device 102/server 112 may include one or more controllers/processors 1504 comprising one-or-more central processing units (CPUs) for processing data and computer-readable instructions and a memory 1506 for storing data and instructions. The memory 1506 may include volatile random access memory (RAM), non-volatile read only memory (ROM), non-volatile magnetoresistive (MRAM) and/or other types of memory. The device 102/server 112 may also include a data storage component 1508 for storing data and processor-executable instructions. The data storage component 1508 may include one or more non-volatile storage types such as magnetic storage, optical storage, solid-state storage, etc. The memory 1506, storage 1508, or other component may also include one or more buffers that may be used to store video data. The device 102/server 112 may also be connected to a removable or external non-volatile memory and/or storage (such as a removable memory card, memory key drive, networked storage, etc.) through the input/output device interfaces 1510.

The device 102/server 112 includes input/output device interfaces 1510. A variety of components may be connected to the device 102 through the input/output device interfaces 1510, such as camera(s) 104 and a microphone 1514. However, the disclosure is not limited thereto and the device 102 may not include an integrated camera or microphone. Thus, the camera(s), microphone 1514 and/or other components may be integrated into the device 102 or may be separate without departing from the disclosure.

The input/output device interfaces 1510 may be configured to operate with a network 1520, for example a wireless local area network (WLAN) (such as WiFi), Bluetooth, zigbee and/or wireless networks, such as a Long Term Evolution (LTE) network, WiMAX network, 3G network, etc. The network 1520 may include a local or private network or may include a wide network such as the Internet. Devices may be connected to the network 1520 through either wired or wireless connections.

The input/output device interfaces 1510 may also include an interface for an external peripheral device connection such as universal serial bus (USB), FireWire, Thunderbolt, Ethernet port or other connection protocol that may connect to networks 1520. The input/output device interfaces 1510 may also include a connection to an antenna (not shown) to connect one or more networks 1520 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/server 112 further includes a tagging module 1524, which may comprise processor-executable instructions stored in storage 1508 to be executed by controller(s)/processor(s) 1504 (e.g., software, firmware), hardware, or some combination thereof. For example, components of the tagging module 1524 may be part of a software application running in the foreground and/or background on the device 102/server 112. The tagging module 1524 may control the device 102 as discussed above, for example with regard to FIGS. 1A, 1B, 4, 7 and/or 8. Some or all of the controllers/modules of the tagging module 1524 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like), FireOS, etc.

The device 102 may also include buffer(s) (not shown) which may store data used by the tagging module 1524 and/or other components as described above. The buffer(s) may be a non-transitory memory. The buffer(s) may be configured to hold a limited amount of video data (for example 1-5 minutes) to allow the device 102 to capture video data prior to a user commanding the device 102 to record the video data.

Executable computer instructions for operating the device 102/server 112 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

As noted above, multiple devices may be employed in a single video processing system. In such a multi-device system, each of the devices may include different components for performing different aspects of the video processing. The multiple devices may include overlapping components. The components of the device(s) 102 and server(s) 112, as illustrated in FIGS. 15A and 15B, are exemplary, and may be located a stand-alone device or may be included, in whole or in part, as a component of a larger device or system.

Figure 16:
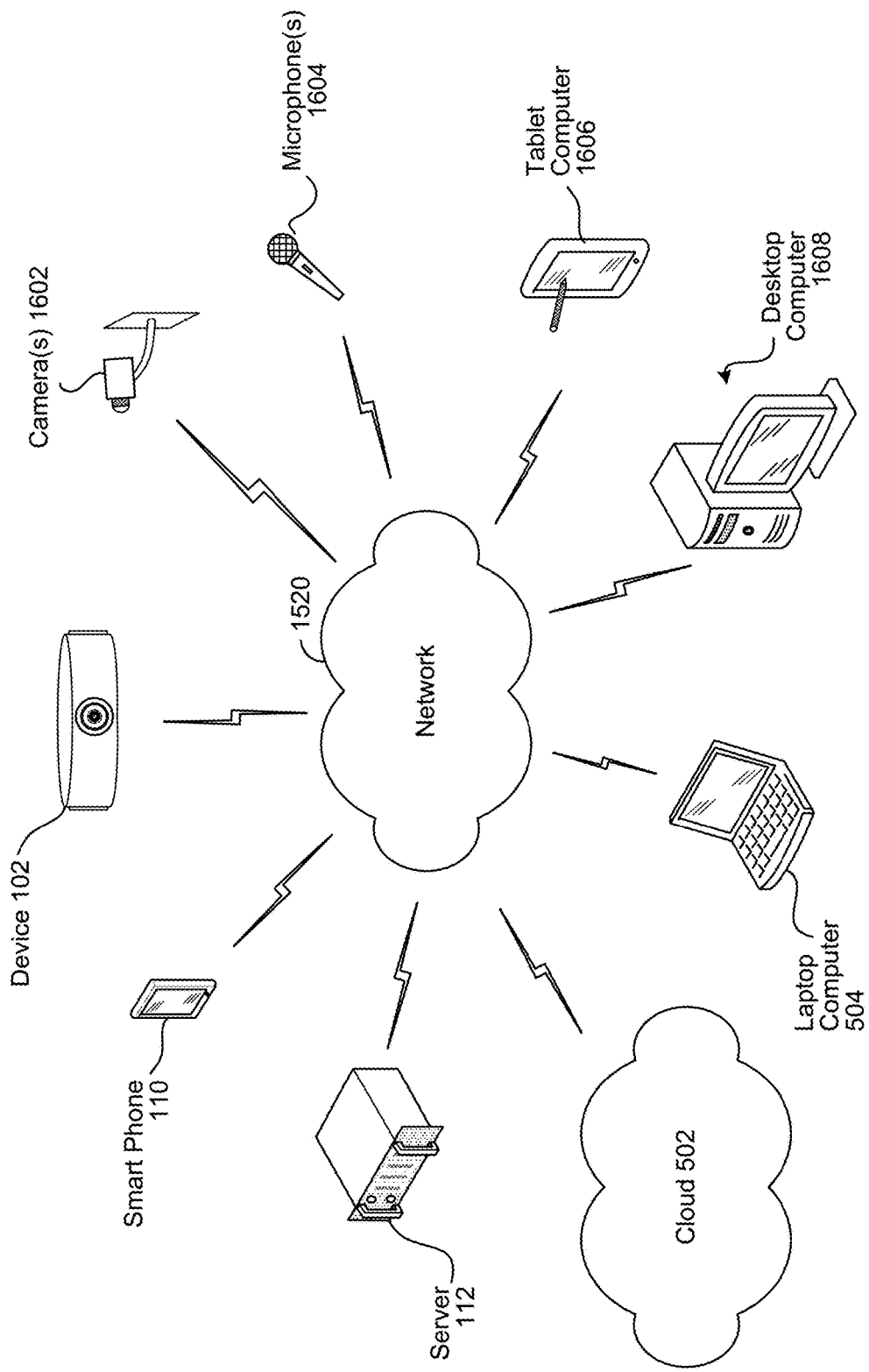
FIG. 16 illustrates an example of a computer network for use with the system.

As illustrated in FIG. 16, multiple devices (102, 110, 112, 502, 504, 1602, 1604, 1606 and/or 1608) may contain components of the system 100 and the devices may be connected over a network 1520. The network 1520 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 1520 through either wired or wireless connections. Network 1520 may include a local or private network or may include a wide network such as the internet. For example, a device 102, a smartphone 110, networked camera(s) 1602 (which may also include one or more microphones), networked microphone(s) 1604 (or networked microphone array(s), not illustrated) may be connected to the network 1520 through a wireless service provider, over a WiFi or cellular network connection or the like. Other devices, such as server 112, laptop computer 504, tablet computer 1606 and/or desktop computer 1608 may connect to the network 1520 through a wired connection or wireless connection.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, from an image-capture device, video data corresponding to a first direction and a second direction;
   receiving, from a first user device associated with a first user profile, a first indicator identifying first image data, wherein the first image data is associated with the first direction and wherein the first image data is a subset of the video data;
   determining that a first time of sending the first indicator occurs after a second time corresponding to a first video beginpoint associated with the first indicator;
   receiving, from a second user device associated with a second user profile, a second indicator identifying second image data, wherein the second image data is associated with the second direction and wherein the second image data is a subset of the video data; and
   generating a first video summarization of the video data, the first video summarization beginning at the first video beginpoint and including the first image data and the second image data.

2. The computer-implemented method of claim 1, further comprising:
   determining a field of view associated with the first direction; and
   selecting a subset of pixel data of the video data to include in the first image data, wherein the subset of pixel data shows an image corresponding to the first direction.

3. The computer-implemented method of claim 1, further comprising:
   receiving a third indicator associated with a third user profile, the third indicator identifying third image data;
   determining a first priority of the first indicator;
   determining a second priority of the second indicator;
   determining a third priority of the third indicator; and
   determining that the third priority is below a priority threshold,
   wherein the first video summarization comprises the first image data and the second image data, but excludes the third image data.

4. The computer-implemented method of claim 3, further comprising:
   determining the first priority based on settings in the first user profile;
   determining the second priority based on settings in the first user profile; and
   determining the third priority based on settings in the first user profile.

5. The computer-implemented method of claim 1, further comprising:

generating a second video summarization including the first image data;
generating a third video summarization including the second image data;
sending, to a destination associated with the first user profile, a link to the second video summarization; and
sending, to a destination associated with the second user profile, a link to the third video summarization.

6. The computer-implemented method of claim 1, further comprising:
determining a first endpoint associated with the first indicator;
determining a second video beginpoint associated with the second indicator;
determining a second endpoint associated with the second indicator;
determining that the second video beginpoint is between the first video beginpoint and the first endpoint; and
determining second video data included in the video data, the second video data extending between the first video beginpoint and the second endpoint,
wherein the first video summarization comprises the second video data.

7. The computer-implemented method of claim 1, further comprising:
determining a first endpoint associated with the first indicator;
determining a second video beginpoint associated with the second indicator;
determining a second endpoint associated with the second indicator;
determining that the second video beginpoint is between the first video beginpoint and the first endpoint;
determining a first subset of pixel data of the video data associated with the first indicator;
determining second video data included in the video data, the second video data extending between the first video beginpoint and the first endpoint;
determining a second subset of pixel data of the video data associated with the second indicator;
determining third video data included in the video data, the third video data extending between the second video beginpoint and the second endpoint; and
determining that the first subset is different from the second subset,
wherein the first video summarization comprises the second video data followed by the third video data.

8. The computer-implemented method of claim 1, further comprising:
determining a first timestamp associated with the first image data;
determining a second timestamp associated with the second image data; and
determining the first timestamp is before the second timestamp,
wherein the first video summarization comprises the first image data prior to the second image data.

9. The computer-implemented method of claim 1, further comprising:
sending, to the first user device, a link to the first video summarization; and
sending, to the second user device, the link to the first video summarization.

10. A computing system, comprising:
at least one processor;
at least one memory including instructions that, when executed by the at least one processor, cause the computing system to perform a set of actions comprising:
receiving, from an image-capture device, video data corresponding to a first direction and a second direction;
receiving, from a first user device associated with a first user profile, a first indicator identifying first image data, wherein the first image data is associated with the first direction and wherein the first image data is a subset of the video data;
determining a first time of sending the first indicator occurs after a second time corresponding to a first video beginpoint associated with the first indicator;
receiving, from a second user device associated with a second user profile, a second indicator identifying second image data, wherein the second image data is associated with the second direction and wherein the second image data is a subset of the video data; and
generating a first video summarization of the video data, the first video summarization beginning at the first video beginpoint and including the first image data and the second image data.

11. The computing system of claim 10, wherein the at least one memory further includes instructions that cause the computing system to further perform:
determining a field of view associated with the first direction; and
selecting a subset of pixel data of the video data to include in the first image data, wherein the subset of pixel data shows an image corresponding to the first direction.

12. The computing system of claim 10, wherein the at least one memory further includes instructions that cause the computing system to further perform:
receiving a third indicator associated with a third user profile, the third indicator identifying third image data;
determining a first priority of the first indicator;
determining a second priority of the second indicator;
determining a third priority of the third indicator; and
determining that the third priority is below a priority threshold,
wherein
the first video summarization comprises the first image data and the second image data, but excludes the third image data.

13. The computing system of claim 12, wherein the at least one memory further includes instructions that cause the computing system to further perform:
determining the first priority based on settings in the first user profile;
determining the second priority based on settings in the first user profile; and
determining the third priority based on settings in the first user profile.

14. The computing system of claim 10, wherein the at least one memory further includes instructions that cause the computing system to further perform
generating a second video summarization including the first image data;
generating a third video summarization including the second image data;
sending, to a destination associated with the first user profile, a link to the second video summarization; and
sending, to a destination associated with the second user profile, a link to the third video summarization.

15. The computing system of claim 10, wherein the at least one memory further includes instructions that cause the computing system to further perform:
- determining a first endpoint associated with the first indicator;
- determining a second video beginpoint associated with the second indicator;
- determining a second endpoint associated with the second indicator;
- determining that the second video beginpoint is between the first video beginpoint and the first endpoint; and
- determining second video data included in the video data, the second video data extending between the first video beginpoint and the second endpoint,
- wherein
  - the first video summarization comprises the second video data.

16. The computing system of claim 10, wherein the at least one memory further includes instructions that cause the computing system to further perform:
- determining a first endpoint associated with the first indicator;
- determining a second video beginpoint associated with the second indicator;
- determining a second endpoint associated with the second indicator;
- determining that the second video beginpoint is between the first video beginpoint and the first endpoint;
- determining a first subset of pixel data of the video data associated with the first indicator;
- determining second video data included in the video data, the second video data extending between the first video beginpoint and the first endpoint;
- determining a second subset of pixel data of the video data associated with the second indicator;
- determining third video data included in the video data, the third video data extending between the second video beginpoint and the second endpoint; and
- determining that the first subset is different from the second subset,
- wherein
  - the first video summarization comprises the second video data followed by the third video data.

17. The computing system of claim 10, wherein the at least one memory further includes instructions that cause the computing system to further perform:
- determining a first timestamp associated with the first image data;
- determining a second timestamp associated with the second image data; and
- determining the first timestamp is before the second timestamp,
- wherein
  - the first video summarization comprises the first image data prior to the second image data.

18. The computing system of claim 10, wherein the at least one memory further includes instructions that cause the computing system to further perform:
- sending, to the first user device, a link to the first video summarization; and
- sending, to the second user device, the link to the first video summarization.

* * * * *